(12) United States Patent
Altonen et al.

(10) Patent No.: US 9,694,527 B2
(45) Date of Patent: Jul. 4, 2017

(54) METHODS OF USING RETROFITTED INJECTION MOLDING MACHINES WITH FASTER CYCLE TIMES

(71) Applicant: iMFLUX Inc., Cincinnati, OH (US)

(72) Inventors: Gene Michael Altonen, West Chester, OH (US); Michael Thomas Dodd, Walton, KY (US)

(73) Assignee: IMFLUX INC, Hamilton, OH (US)

(*) Notice: Subject to any disclaimer, the term of this patent is extended or adjusted under 35 U.S.C. 154(b) by 0 days.

(21) Appl. No.: 14/861,282

(22) Filed: Sep. 22, 2015

(65) Prior Publication Data

US 2016/0082636 A1  Mar. 24, 2016

Related U.S. Application Data

(60) Provisional application No. 62/053,499, filed on Sep. 22, 2014.

(51) Int. Cl.
| | |
|---|---|
| *B29C 45/76* | (2006.01) |
| *B29C 45/77* | (2006.01) |
| *B29C 33/38* | (2006.01) |
| *B29C 45/74* | (2006.01) |

(Continued)

(52) U.S. Cl.
CPC .......... *B29C 45/77* (2013.01); *B29C 33/3842* (2013.01); *B29C 45/74* (2013.01); *B29C 45/76* (2013.01); *B29C 45/762* (2013.01); *B29C 45/78* (2013.01); *B29C 2045/776* (2013.01); *B29C 2945/76498* (2013.01); *B29C 2945/76501* (2013.01); *B29C 2945/76535* (2013.01); *B29C 2945/76545* (2013.01); *B29C 2945/76561* (2013.01); *B29C 2945/76688* (2013.01); *B29C 2945/76859* (2013.01); *B29C 2945/76936* (2013.01); *B29C 2945/76939* (2013.01); *B29K 2101/00* (2013.01)

(58) Field of Classification Search
CPC  B29C 2945/76498; B29C 2945/76859; B29C 2945/76066; B29C 2945/76381; B29C 2945/76939; B29C 45/762; B29C 45/766
See application file for complete search history.

(56) References Cited

U.S. PATENT DOCUMENTS

| | | | |
|---|---|---|---|
| 5,407,342 A | 4/1995 | Boucher | |
| 5,968,439 A * | 10/1999 | Grove | B29C 45/561 264/297.2 |
| 2012/0295050 A1 | 11/2012 | Altonen | |

(Continued)

OTHER PUBLICATIONS

FACTS, Inc. Process Control Systems, Doc. 1528-00, two pages, May 1, 2012.*

(Continued)

*Primary Examiner* — Jill Heitbrink
(74) *Attorney, Agent, or Firm* — Marshall, Gerstein & Borun LLP

(57) ABSTRACT

An injection molding machine that uses a mold and a native controller to operate according to an original mold cycle to mold plastic objects is retrofitted with a retrofit controller; the retrofitted machine uses the mold and the retrofit controller to operate according to a retrofit mold cycle to mold plastic objects. When molding according to the retrofit mold cycle, the injection molding machine can obtain a faster cycle time.

19 Claims, 14 Drawing Sheets

(51) Int. Cl.
  *B29C 45/78* (2006.01)
  *B29K 101/00* (2006.01)

(56) References Cited

U.S. PATENT DOCUMENTS

| | | | |
|---|---|---|---|
| 2013/0113131 A1* | 5/2013 | Altonen | B29C 45/77 264/40.1 |
| 2013/0221575 A1 | 8/2013 | Altonen | |
| 2015/0151473 A1 | 6/2015 | Olaru | |
| 2016/0082637 A1 | 3/2016 | Altonen et al. | |
| 2016/0082638 A1 | 3/2016 | Altonen et al. | |
| 2016/0082639 A1 | 3/2016 | Altonen et al. | |
| 2016/0096303 A1 | 4/2016 | Altonen et al. | |

OTHER PUBLICATIONS

Toshiba Machine, All Electric Injection Molding Machine EC-SX Medium and Large-size series, pp. 1-4, Oct. 2, 2012.*
Toshiba Machine, B-1 Five New Technologies of the Injection Molding Machine Series EC-SX, pp. 1-6, Mary 9, 2012.*
Toshiba Machine, INJECTVISOR-V50, pp. 1-3, Oct. 3, 2012.*
Toshiba Machine, INJECTVISOR-V30, pp. 1-3, Oct. 3, 2012.*
U.S. Appl. No. 14/861,190, filed Sep. 22, 2015, Altonen.
U.S. Appl. No. 14/861,228, filed Sep. 22, 2015, Altonen.
U.S. Appl. No. 14/861,257, filed Sep. 22, 2015, Altonen.
Piggy-Back Controller, IBM Technical Disclosure Bulletin, vol. 39, No. 4, Apr. 1996, p. 25 (1 page document), XP000587408.
FPGA-Based Multiprocessor System for Injection Molding Control, Sensors 2012, 12, 14068-14083; doi:10.3390/s121014068, Munoz-Barron, 16 page document, XP55182009A.
Cincinnati Process Technologies, "Control Retrofits: Modern Control Upgrades for Your Molding Operations", brochure (Aug. 2013).
Delta Computer Systems, Motion Control System Retrofits Increase Machine Productivity and Cut Lifecycle Costs (Apr. 2009).
Eurotherm® by Schneider Electric, MACO® Compact Retrofit brochure (Feb. 2015).
Lancaster, Injection Molder Cuts Scrap from 8% to 0.5% with Closed-Loop Controllers, Solid Controls Inc. (2001).
Mold Masters, TempMaster™ iM2 Series, Purge Wizard brochure (2014).
Naitove, "Making Older Hydraulic Injection Machines More Energy Efficient", Plastics Technology, Feb. 2012).
Progressive Controls & Automation LLC, Control Retrofits for Injection Molding & Structural Foam Machines, downloaded from the Internet at: <http://www.pcaimpact.com/products/control-retrofit-injection-foam> (2010).
Rexroth Bosch Group, Retrofits/Rebuilds, downloaded from the Internet at: <https://www.boschrexroth.com/en/us/industries/machinery-applications-and-engineering/plastic-machinery-and-die-casting/applications/retrofitsrebuilds/retrofitsrebuilds> (admitted prior art).

* cited by examiner

METHODS OF USING RETROFITTED INJECTION MOLDING MACHINES WITH FASTER CYCLE TIMES

FIELD OF THE INVENTION

The present application generally relates to injection molding, and specifically relates to injection molding machines that are retrofitted with a controller having a retrofit mold cycle.

BACKGROUND OF THE INVENTION

Injection molding machines are commonly used to mold plastic objects. An injection molding machine molds plastic objects by repeatedly performing a mold cycle. During each mold cycle, the machine injects molten plastic into a mold, cools the plastic, opens the mold, ejects the molded object, closes the mold, and recovers for the next cycle. Various injection molding machines include variations of this mold cycle, as known in the art. A controller, which is programmed with the mold cycle, controls the machine according to the mold cycle.

Injection molds are designed to mold particular objects from particular plastics at particular pressures. Injection molding machines are designed to accept a range of mold sizes and to inject plastic within a range of injection pressures. A molding machine and its mold can be designed to last for many mold cycles.

It can be challenging to make changes to an injection molding machine. Since a molded object is planned for a particular end use, it is usually not feasible to significantly change its plastic material. Since a mold is manufactured with particular geometries shaped in metal, it is usually not possible to significantly change its configuration. And since an injection molding machine is designed and built as a complete, integrated unit, it is usually impractical to change its set-up.

Thus, many molding machines operate with substantially the same material, mold, and mold cycle, for the life of the mold—sometimes many years. On the one hand, operating over a long life allows this equipment to pay back its large capital expense. On the other hand, operating over a long life without significant improvements means that any inefficiencies in the mold cycle accumulate more costs over time.

SUMMARY OF THE INVENTION

However, embodiments of the present disclosure can be used to improve the operation of a molding machine by changing its original mold cycle to a retrofit mold cycle. The original mold cycle is the mold cycle used on an injection molding machine that has not yet been retrofitted with the addition of a retrofit controller to the machine. The retrofit mold cycle is the mold cycle that differs from the original mold cycle, and is used on an injection molding machine that has been retrofitted with the addition of a retrofit controller to the machine.

A retrofit mold cycle can allow an injection molding machine to use lower injection pressures, when compared with the original mold cycle. Operating at lower pressures uses less energy, reduces stress on mechanical components, and increases the safety factor for the machine. The machine can use less energy at lower pressures since its injection unit does not need to perform as much work. The reduced stress can lengthen the life of mechanical components and decrease the possibility of their failure. The machine can operate at an increased safety factor, since there will be a relatively greater difference between its operating pressures and the maximum rated pressure for the machine.

A retrofit mold cycle can also allow an injection molding machine to use more constant injection pressures, when compared with the original mold cycle. Operating at more constant pressures provides better melt flow through the mold cavity and better contact between the molten plastic and the surface of the mold cavity. Better melt flow can lead to smoother and more consistent filling, which improves the quality of the molded object. Better contact can lead to better heat-transfer between the molten plastic and the mold. Better heat transfer can ensure that plastic remains molten throughout the filling (avoiding 'freeze-off' problems). Better heat transfer can also provide faster cooling. Faster cooling can lead to faster mold cycle times and thus, greater throughput for the machine.

In various embodiments, a retrofitted molding machine can use a retrofit controller to mold according to a retrofit mold cycle can that has an average retrofit cycle time (averaged over ten consecutive cycles of making production versions of molded part(s)), which is the same as or even shorter (i.e. faster) than an average original cycle time (also averaged over ten consecutive cycles of making production versions of molded part(s)) for an original mold cycle previously used. For example, depending on the particular application, a retrofit average cycle time can be shorter by 5-50%, or any integer value for percentage in that range, or any range formed by any of those integer values, such as from 5-40%, or from 10-30%, or from 15-25%.

Further, in various embodiments, even after an injection molding machine is retrofitted with a retrofit controller, the machine may continue to partially use the native controller, with the native controller assisting in controlling the machine according to a retrofit mold cycle. In particular, the retrofit controller can begin to control some or all of the plastic injecting in the retrofit mold cycle, while the native controller can continue to control some or all of the other functions in the retrofit mold cycle. This approach offers some advantages over completely replacing a native controller with a retrofit controller.

A first advantage of this retrofitting approach is reducing complexity and cost. Since the native controller can be left to control functions such as cooling the plastic, opening the mold, ejecting the molded object, closing the mold, and recovering the machine conditions for a new cycle, the retrofit controller does not require logic, commands, and/or executable program instructions to perform these functions. This makes the retrofit controller simpler and cheaper to design and build. And, since the native controller continues to control these functions, some or all of the inputs and/or outputs related to these functions do not need to be transferred to the retrofit controller. This makes the retrofitting process faster and more straightforward, requiring less labor and less downtime for the machine.

A second advantage of this retrofitting approach is targeting significant improvements. While changes to the other functions (cooling, opening, ejecting, closing, recovery, etc.) can affect the mold cycle, changes to the plastic injecting can provide much more significant improvements to the mold cycle (as explained above and herein). So the plastic injecting is the key portion of the mold cycle, for making improvements. Since the retrofit controller is specifically designed to control the plastic injecting in a new and improved way, the retrofit controller provides a targeted benefit to the retrofitted injection molding machine, when it is controlled according to the retrofit mold cycle. Additionally, since the retrofit controller does not need to control the other functions, the retrofit controller is able to achieve faster processing for its control of the plastic injecting.

A third advantage of this retrofitting approach is continuing aspects of the original design for the molding machine. Since an injection molding machine is designed and built as a complete, integrated unit, the native controller includes logic, commands, and/or executable program instructions that were matched to known specifications of the machine's components. The logic, commands, and/or executable program instructions were also designed to be part of an overall safety scheme for the machine. By continuing to use the native controller to at least partially control the retrofit mold cycle, there is a reduced risk that the retrofitted machine will work in an incorrect or unsafe manner. Further, by adding a retrofit controller while retaining the native controller, the machine manufacturer's warranty may continue, without being voided.

A fourth advantage of this retrofitting approach is leveraging existing familiarity with the native controller and the molding machine. An injection molding machine includes a user interface, which allows its users to start, monitor, and stop the machine. An injection molding machine also includes various machine configurations, which are common to its manufacturer, are explained in its original technical documentation (e.g. manuals), and are likely known to technicians who maintain and repair the machine. By continuing to use the native controller to at least partially control the retrofit mold cycle, it is possible to maintain most (or even all) of the original user interface as well as many of the original machine configurations. As a result, operators and technicians may need little (or even no) additional training, to competently use and service the retrofitted machine.

A fifth advantage of this retrofitting approach is the ability to easily disable the retrofit controller, if needed. A retrofitted injection molding machine can include a disable switch, which can allow a user of the retrofitted injection molding machine to select a mode of injection molding that disables the retrofit controller, such that the machine and the native controller mold production versions of the plastic object according to the original mold cycle. The disable function can be useful for isolating the retrofit controller from the rest of the molding machine for trouble-shooting purposes. The disable function can also enable a user to switch back to an original mold cycle for specific instances where running the original mold cycle is required.

It is believed that the embodiments of retrofitting in the present disclosure can be used with various kinds of injection molding applications for various molded objects. However, it is expected that the embodiments of retrofitting in the present disclosure offer particular advantages to molded objects with small Nominal Wall Thickness (NWT), molded objects with large Length-over-Thickness (L/T) ratios, and molded objects that exhibit shear-thinning behavior. As an example, it is expected that the embodiments of retrofitting in the present disclosure offer particular advantages to molded objects with NWT of 0.1-10 millimeters, or any value in increments of 0.1 millimeters within that range, or any range formed by any of these values, such as 0.5-8 millimeters, 1.0-5 millimeters, 1.5-3 millimeters, etc. As another example, it is expected that the embodiments of retrofitting in the present disclosure offer particular advantages to molded objects with L/T ratios of 50-500, or any integer value within that range, or any range formed by any of these values, such as 100-500, 150-500, 200-500, 250-500, 100-300, 100-250, 100-200, 100-150, etc.

In various embodiments, an injection molding machine can include an injection unit, a nozzle, and a mold, in fluid communication with each other, as known in the art. The injection unit can be any kind of injection unit, which uses pressure to inject molten plastic through the nozzle and into the mold. As examples, an injection unit can be hydraulically driven, mechanically driven, electrically driven, or combinations of these, or any other kind of injection unit, as described herein, or as known in the art. The mold can be any kind of mold with one or more cavities to mold one or more plastic objects. (Although explanations and examples herein may refer to a single molded plastic object, this is for convenience and should not be construed as a limitation; the present disclosure contemplates that any embodiment disclosed herein can be used with a mold having any number of cavities.) Any of the components of the injection molding machine, such as the injection unit, can have a maximum rated injection pressure, with the rating provided by the manufacturer. For example, an injection molding machine can include an injection unit having a maximum rated injection pressure from 15,000 psi (103.42 MPa) to 60,000 psi (413.69 MPa) or any integer value for psi in that range, or any range formed by any of those integer values, such as from 20,000 psi (137.90 MPa) to 50,000 psi (344.74 MPa) or from 25,000 psi (172.37 MPa) to 40,000 psi (275.79 MPa).

The molding machine can include a native controller. The native controller can be any kind of controller, such as an electro-mechanical controller, a circuit board, a programmable logic controller, an industrial computer, or any other kind of controller, as described herein, or as known in the art. The native controller can be set, configured, and/or programmed to partially or fully control some or all parts of the injection molding machine, as described herein, or as known in the art. The native controller can be set, configured, and/or programmed with logic, commands, and/or executable program instructions according to any embodiment disclosed herein, or as known in the art.

The native controller can be physically positioned in various ways, with respect to the injection molding machine. As examples, the native controller can be integral with the machine, the native controller can be contained in an enclosure that is mounted on the machine, the native controller can be contained in a separate enclosure that is positioned adjacent or proximate to the machine, or the native controller can be positioned remote from the machine. In some embodiments, the native controller can partially or fully control functions of the machine by wired signal communication; in other embodiments the native controller can partially or fully control functions of the machine by wireless signal communication, as known in the art.

The native controller can be set, configured, and/or programmed to partially or fully control injection pressures of the machine. The native controller can control injection pressures in any way described herein or known in the art. As an example, the native controller can control injection pressures by controlling rates of injection by the injection unit. As another example, the native controller can control injection pressures by controlling rates of melt flow through the nozzle.

The native controller can be set, configured, and/or programmed with logic, commands, and/or executable program instructions corresponding with an original mold cycle. The native controller can use, perform, and/or execute such logic, commands, and/or instructions, to control the injection molding machine to cause the machine to mold plastic objects according to the original mold cycle.

As an example, an injection molding machine can use an original mold cycle to inject plastic according to a conventional mold cycle, which includes the following portions: initial injecting, filling, packing, and holding. An original mold cycle has a maximum original injection pressure, which is the highest injection pressure reached during the cycle. Throughout the present disclosure all injection pressures are measured in the nozzle, unless stated otherwise.

In various conventional embodiments, an original mold cycle can have a maximum original injection pressure that is 65-100% of the maximum rated injection pressure for the injection unit (or for the molding machine), or any integer value for percentage in that range, or any range formed by any of those integer values, such as 70-100%, 75-100%, or 80-100% of the maximum rated injection pressure. In various conventional embodiments, an original mold cycle can have a maximum original injection pressure from 20,000 psi (137.90 MPa) to 60,000 psi (413.69 MPa) or any integer value for psi in that range, or any range formed by any of those integer values, such as from 25,000 psi (172.37 MPa) to 50,000 psi (344.74 MPa) or from 30,000 psi (206.84 MPa) to 40,000 psi (275.79 MPa).

In various conventional embodiments, an original mold cycle can have injection pressures that vary significantly over the course of the mold cycle, or vary within part, parts, or all of any particular portion of the mold cycle. As examples, for at least part of a filling portion of an original mold cycle, an injection pressure of a machine can vary by 10-60%, by 20-60%, or even by 30-60%, with respect to an original target injection pressure, or a reference value for injection pressure, for part, parts, substantially all, or all of the filling portion. Such variations can occur within 50-100% of the filling portion, or any integer value for percentage in that range, or any range formed by any of those integer values, such as 60-100%, 70-100%, or 80-100% of the filling portion. Such periods of variation can occur at the beginning of the filling portion, can occur at the end of the filling portion, and/or can be centered on the middle of the filling portion.

An injection molding machine can have a native controller programmed with a maximum programmed original safe pressure setting that is 80-120% of the maximum rated injection pressure for the injection unit (or for the molding machine), or any integer value for percentage in that range, or any range formed by any of those integer values, such as 90-110%, 90-100%, or 95-105% of the maximum rated injection pressure. The native controller can be programmed to stop the injection unit if an injection pressure of the injection molding machine exceeds the maximum programmed original safe pressure setting.

An injection molding machine can also have an original pressure relief mechanism with a maximum original safe pressure setting that is 80-120% of the maximum rated injection pressure for the injection unit (or for the molding machine), or any integer value for percentage in that range, or any range formed by any of those integer values, such as 90-110%, 90-100%, or 95-105% of the maximum rated injection pressure. The pressure relief mechanism can be set to relieve pressure in the injection molding machine if an injection pressure of the machine exceeds the maximum original safe pressure setting.

An injection molding machine can be retrofitted by adding a retrofit controller to the machine, as described herein. The machine that is retrofitted can be the same machine in which a mold was run according to an original mold cycle, or the machine being retrofitted may be a different molding machine having the same configuration as the machine that ran the original mold cycle. Any of the functions and benefits of retrofitting described herein can be obtained by using the same machine (or a machine of the same configuration).

The retrofitted machine can run the retrofit mold cycle using the same mold that was used to run the original mold cycle, or the retrofitted machine may use a different mold having the same configuration as the mold used with the original mold cycle. Any of the functions and benefits of retrofitting described herein can be obtained by using the same mold (or a mold of the same configuration).

The retrofitted machine can run the retrofit mold cycle using the same plastic material that was used in the original mold cycle, or the retrofitted machine may use a different plastic material that is essentially the same, or that has material properties (such as Melt Flow Index), which are the same, or substantially the same.

The retrofit controller can be any kind of controller, such as an electro-mechanical controller, a circuit board, a programmable logic controller, an industrial computer, or any other kind of controller, as described herein, or as known in the art. The retrofit controller can be set, configured, and/or programmed to partially or fully control some or all parts of the injection molding machine, as described herein, or as known in the art. The retrofit controller can be set, configured, and/or programmed with logic, commands, and/or executable program instructions according to any embodiment disclosed herein, or as known in the art.

In some embodiments of retrofitting, the retrofit controller can replace the native controller and replace all of its functions. In other embodiments of retrofitting, the retrofit controller can be added as an addition to the native controller and replace less than all of its functions. In alternative embodiments, a native controller can be reconfigured to become a retrofit controller, as described herein.

In any of the prior embodiments, the retrofitting can include establishing signal communication between the retrofit controller and the injection molding machine. This establishing can include connecting one or more outputs from sensors (e.g. pressure sensors, temperature sensors, positions sensors, etc.) on the machine, to one or more inputs of the retrofit controller. This connecting can include disconnecting one or more of the existing sensor outputs from the native controller and connecting those existing sensor outputs to the retrofit controller, or adding more outputs to one or more of the existing sensors and connecting those added outputs to the retrofit controller, or combinations of these. This connecting can involve one or more existing sensors already in place on the molding machine, or moving one or more existing sensors to new locations on the molding machine, or installing one or more new sensors on the molding machine, or combinations of these.

The retrofitting can use any kind of (existing or new) sensor described herein or known in the art. The signal communication can be any kind of signal (e.g. hydraulic, pneumatic, mechanical, analog electrical, digital electrical, optical, etc.) described herein or known in the art.

In any of the prior embodiments, the retrofitting can include establishing signal communication between the retrofit controller and the native controller. This establishing can include connecting one or more outputs of the native controller to inputs of the retrofit controller, connecting one or more outputs of the retrofit controller to inputs of the native controller, or otherwise sharing signals, data, and/or information between the native controller and the retrofit controller in any way described herein or known in the art, or combinations of these.

The retrofit controller can be physically positioned in various ways, with respect to the injection molding machine. As examples, the retrofit controller can be integral with the machine, the retrofit controller can be contained in an enclosure that is mounted on the machine, the retrofit controller can be contained in a separate enclosure that is positioned adjacent or proximate to the machine, or the retrofit controller can be positioned remote from the machine. In some embodiments, the retrofit controller can partially or fully control functions of the machine by wired signal communication; in other embodiments the retrofit controller can partially or fully control functions of the machine by wireless signal communication, as known in the art.

The retrofit controller can be set, configured, and/or programmed to partially or fully control injection pressures of the machine. The retrofit controller can control injection pressures in any way described herein or known in the art. As an example, the retrofit controller can control injection pressures by controlling rates of injection by the injection unit. As another example, the retrofit controller can control injection pressures by controlling rates of melt flow through the nozzle.

The retrofit controller can be set, configured, and/or programmed with logic, commands, and/or executable program instructions corresponding with any portion, or any multiple portions, or all of a retrofit mold cycle. The retrofit controller can use, perform, and/or execute such logic, commands and/or instructions, to control the injection molding machine to cause the machine to mold plastic objects according to the retrofit mold cycle.

A retrofitted injection molding machine can inject plastic according to a retrofit mold cycle, which includes the following portions: initial injecting, filling, and decreasing pressure. A retrofit mold cycle can have a maximum retrofit injection pressure, which is the highest injection pressure reached during the cycle.

In various embodiments, a retrofit mold cycle can have a maximum retrofit injection pressure that is 10-60% of the maximum original injection pressure of the original mold cycle, or any integer value for percentage in that range, or any range formed by any of those integer values, such as 20-60%, 30-60%, or 40-60% of the maximum original injection pressure.

In such embodiments, wherein a retrofit mold cycle has one or more reduced pressures, when compared with an original mold cycle, such reductions can be achieved even when using the same (or similar) injection molding machine, the same (or similar) mold, and/or the same (or similar) plastic material, as was used with the original mold cycle.

Also, in embodiments wherein a retrofit mold cycle has one or more reduced pressures, when compared with an original mold cycle, such reductions can be achieved even when using a machine temperature profile (i.e. the overall configuration of heating elements, and their process settings for the molding machine) that is the same or substantially the same.

Alternatively, in embodiments wherein a retrofit mold cycle has one or more reduced pressures, when compared with an original mold cycle, such reductions can allow for temperature reductions in the machine's temperature profile (as used herein, an injection molding machine's temperature profile refers to the average of all of the temperature set-points for all of the heaters used to heat the plastic being processed by the injection molding machine); while such reductions might provide an otherwise unacceptable increase in melt pressures in the machine, reducing the injection pressure can allow such temperature reductions to be realized.

In various embodiments, a retrofit mold cycle can use a machine temperature profile that is 5-50° C. less than a machine temperature profile of an original mold cycle, or less by any integer value for degrees Celsius between 5 and 50, or less by any range formed by any of those integer values, such as 5-40° C. less, 5-30° C. less, 5-20° C. less, 5-10° C. less, 10-50° C. less, 20-50° C. less, 30-50° C. less, 40-50° C. less, 10-40° C. less, 20-30° C. less, etc.

Such reduced machine temperature profiles can be obtained with respect to machine temperature profile measurements taken at various times. As a first example, any of the reduced machine temperature profiles described above can be obtained by comparing an average original mold cycle machine temperature profile (which is the average machine temperature profile over the course of an original mold cycle) with an average retrofit mold cycle machine temperature profile (which is the average machine temperature profile over the course of a retrofit mold cycle). As a second example, any of the reduced machine temperature profiles described above can be obtained by comparing an average original filling portion machine temperature profiles (which is the average machine temperature profile over the course of a filling portion of an original mold cycle) with an average retrofit filling portion machine temperature profile (which is the average machine temperature profile over a filling portion of a retrofit mold cycle). As a third example, any of the machine temperature profiles described above can be obtained by comparing a machine temperature profile at the beginning of a filling portion of an original mold cycle to a machine temperature profile at the beginning of a filling portion of a retrofit mold cycle. As a fourth example, any of the machine temperature profiles described above can be obtained by comparing a machine temperature profile at the end of a filling portion of an original mold cycle to a machine temperature profile at the end of a filling portion of a retrofit mold cycle.

When a machine's temperature profile is reduced as part of a retrofit mold cycle, the molten plastic can experience a reduced temperature, when compared to the temperature of the molten plastic during an original mold cycle. Throughout the present disclosure all temperatures of the molten plastic are measured in the nozzle, unless stated otherwise.

A retrofit mold cycle can cause molten plastic in an injection molding machine to experience a reduced temperature that is 5-50° C. less than a temperature of molten plastic in the machine during an original mold cycle; the reduced temperature can also be less by any integer value for degrees Celsius between 5 and 50, or less by any range formed by any of those integer values, such as 5-40° C. less, 5-30° C. less, 5-20° C. less, 5-10° C. less, 10-50° C. less, 20-50° C. less, 30-50° C. less, 40-50° C. less, 10-40° C. less, 20-30° C. less, etc.

Such reduced melt temperatures can be obtained with respect to temperature measurements taken at various times. As a first example, any of the reduced melt temperatures described above can be obtained by comparing a maximum original melt temperature (which is the highest melt temperature reached during an original mold cycle) with a maximum retrofit melt pressure (which is the highest melt temperature reached during a retrofit mold cycle). As a second example, any of the reduced melt temperatures described above can be obtained by comparing an average original mold cycle melt temperature (which is the average melt temperature of the molten plastic over the course of an original mold cycle) with an average retrofit mold cycle melt temperature (which is the average melt temperature of the molten plastic over the course of a retrofit mold cycle). As a third example, any of the reduced melt temperatures described above can be obtained by comparing an average original filling portion melt temperature (which is the average melt temperature of the molten plastic over the course of a filling portion of an original mold cycle) with an average retrofit filling portion melt temperature (which is the average melt temperature of the molten plastic over a filling portion of a retrofit mold cycle). As a fourth example, any of the reduced melt temperatures described above can be obtained by comparing a melt temperature at the beginning of a filling portion of an original mold cycle to a melt temperature at the beginning of a filling portion of a retrofit mold cycle. As a fifth example, any of the reduced melt temperatures described above can be obtained by comparing a melt temperature at the end of a filling portion of an original mold cycle to a melt temperature at the end of a filling portion of a retrofit mold cycle.

In such embodiments, wherein a retrofit mold cycle causes the molten plastic to experience one or more reduced temperatures, when compared with an original mold cycle, such reductions can be achieved even when using a plastic material that is the same, or essentially the same, or having material properties (such as Melt Flow Index), which are the same, or substantially the same.

A retrofit controller can be programmed with a retrofit target injection pressure for a filling portion of a retrofit mold cycle. The retrofit target injection pressure for the filling portion can be estimated, calculated, or empirically determined. For example, a retrofit target injection pressure can be empirically determined by iteratively testing a molding machine with different injection pressures. A starting pressure for this testing can be a maximum original injection pressure for an original mold cycle or an original target injection pressure for a filling portion of the original mold cycle. From the starting pressure, the testing can include operating the molding machine at progressively lower injection pressures, and verifying a quality of molded objects made by the machine at each lower pressure. In various embodiments, a bracketing approach can be used, to determine a relatively lower retrofit target injection pressure, at which the molding machine can still make a molded object of good quality.

In any embodiment disclosed herein, a retrofit mold cycle can have injection pressures that vary somewhat over the course of the mold cycle, or vary within part, parts, or all of any particular portion of the mold cycle, but are still substantially constant. As used herein, an injection pressure is considered to be "substantially constant" when the injection pressure varies up or down by less than 30% with respect to a target injection pressure or a reference value for injection pressure. As examples, for at least part of a filling portion of an original mold cycle, an injection pressure of a machine can be substantially constant and vary by less than 30%, by less than 20%, by less than 10%, or even by less than 5%, with respect to a retrofit target injection pressure, or a reference value for injection pressure, for the filling portion. Such limits on variation can be in effect within 50-100% of the filling portion, or any integer value for percentage in that range, or any range formed by any of those integer values, such as 60-100%, 70-100%, 80-100%, or 90-100% of the filling portion. Such limitations on pressure variation can begin at the beginning of the filling portion, can end at the end of the filling portion, and/or can be centered on the middle of the filling portion.

A retrofit controller can be programmed with a maximum programmed retrofit safe pressure setting that is 80-120% of the maximum retrofit injection pressure, or any integer value for percentage in that range, or any range formed by any of those integer values, such as 100-110% or 100-105%. The retrofit controller can be programmed to stop the injection unit if an injection pressure of the injection molding machine exceeds the maximum programmed retrofit safe pressure setting.

Instead of (or in addition to) programming the retrofit controller with a maximum programmed retrofit safe pressure setting, the retrofitting can include reprogramming the native controller from a maximum programmed original safe pressure setting to a maximum programmed revised safe pressure setting. The maximum programmed revised safe pressure setting can also be 80-120% of the maximum retrofit injection pressure, or any integer value for percentage in that range, or any range formed by any of those integer values, such as 100-110% or 100-105%.

If an injection molding machine has an original pressure relief mechanism, then the retrofitting can include resetting the original pressure relief mechanism from a maximum original safe pressure setting to a maximum revised safe pressure setting. The maximum revised safe pressure setting can be 80-120% of the maximum retrofit injection pressure, or any integer value for percentage in that range, or any range formed by any of those integer values, such as 100-110% or 100-105%.

Instead of (or in addition to) resetting an original pressure relief mechanism with a maximum revised safe pressure setting, the retrofitting can include adding a retrofit pressure relief mechanism, which is set to a maximum retrofit safe pressure setting. The maximum retrofit safe pressure setting can be 80-120% of the maximum retrofit injection pressure, or any integer value for percentage in that range, or any range formed by any of those integer values, such as 100-110% or 100-105%.

Any of the embodiments described in this Summary section can be carried out in any way disclosed herein or known in the art, and can be used and/or combined in any workable combination, including any alternative embodiments.

DETAILED DESCRIPTION OF THE INVENTION

Figure 1:
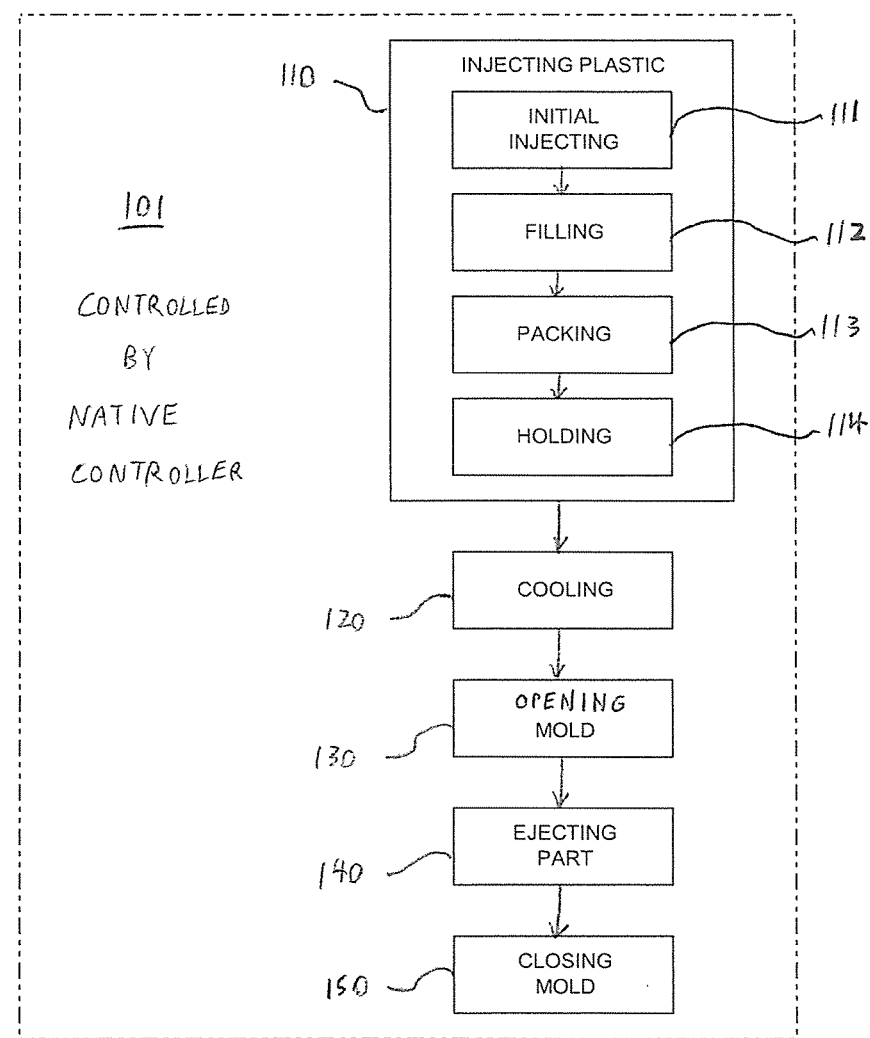
FIG. 1 is an illustration of an exemplary original injection mold cycle, as programmed on an exemplary native controller, for controlling an injection molding machine, according to the prior art.
Figure 2:
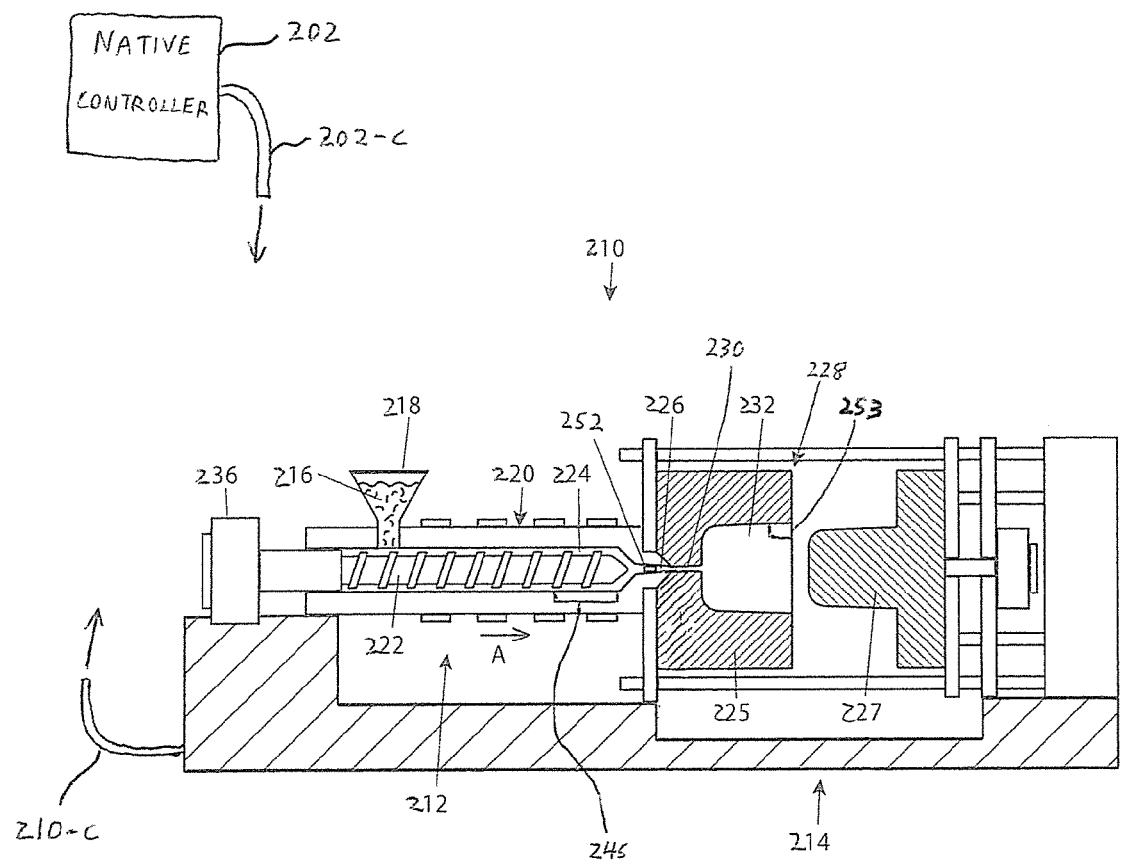
FIG. 2 is an elevation cut-away view of an exemplary injection molding machine controlled by a native controller, according to the prior art.
Figure 3:
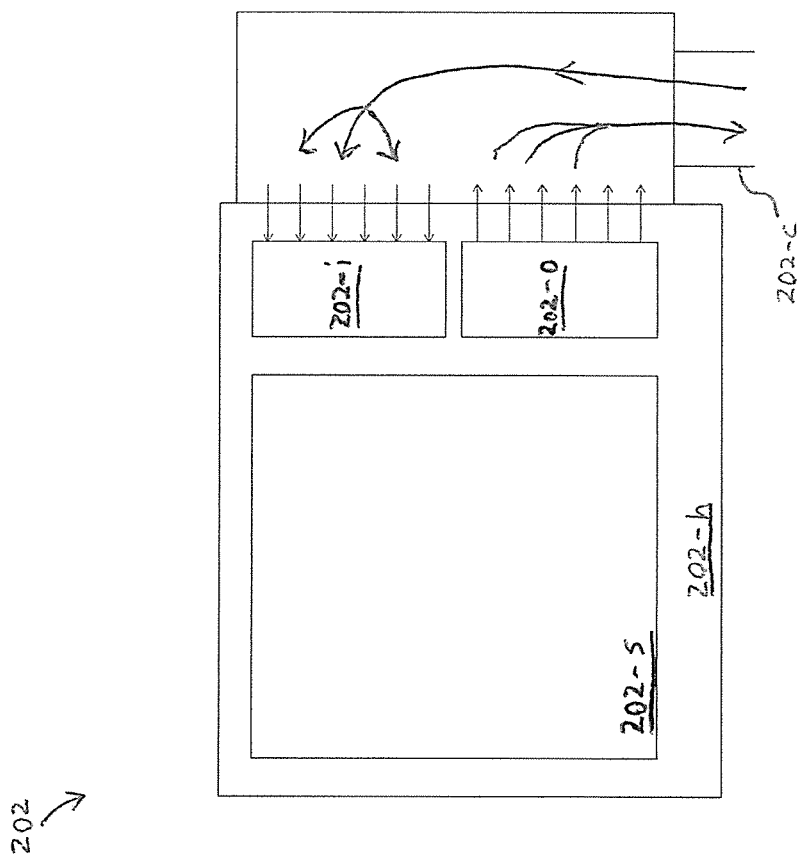
FIG. 3 is an illustration of parts of the native controller of FIG. 2, according to the prior art.

FIG. 1 is an illustration of an exemplary original injection mold cycle 100, as programmed on an exemplary native controller, such as the native controller 202 of FIGS. 2 and 3, for controlling 101 an injection molding machine, such as the exemplary injection molding machine 210 of FIG. 2, according to the prior art. The original injection mold cycle 100 includes an operating sequence of injecting molten plastic 110, cooling the plastic 120, opening the mold 130, ejecting the molded object from the mold 140, and closing the mold 150; these operations are often performed in this order, though there may be some overlap between certain operations, and in various embodiments, one or more additional operations may be added. The injecting of the molten plastic 110 includes an initial injecting portion 111, a filling portion 112, a packing portion 113, and a holding portion 114; however, in various embodiments, injecting may include different portions. The injecting of the molten plastic 110 can be performed in any way known in the art, such as according to the chart of FIG. 4.

FIG. 2 is an elevation cut-away view of an exemplary injection molding machine 210 controlled by a native controller 202, according to the prior art. The molding machine 210 includes an injection unit 212 and a clamping unit 214. A plastic material may be introduced to the injection unit 212 in the form of plastic pellets 216. The plastic pellets 216 may be placed into a hopper 218, which feeds the plastic pellets 216 into a heated barrel 220 of the injection unit 212. The plastic pellets 216, after being fed into the heated barrel 220, may be driven to the end of the heated barrel 220 by a reciprocating screw 222. The heating of the heated barrel 220 and the compression of the plastic pellets 216 by the reciprocating screw 222 causes the plastic pellets 216 to melt, forming a molten plastic material 224. The molten plastic material is typically processed at a temperature selected within a range of about 130° C. to about 410° C.

The reciprocating screw 222 forces the molten plastic material 224, toward a nozzle 226 to form a shot of plastic material, which will be injected into a mold cavity 232 of a mold 228 via one or more gates 230, which direct the flow of the molten plastic material 224 to the mold cavity 232. In various embodiments, the mold 228 may be a heated mold or may be an unheated mold. In other embodiments the nozzle 226 may be separated from one or more gates 230 by a feed system with various runners (that may or may not be heated). The mold cavity 232 is formed between first and second mold sides 225, 227 of the mold 228 and the first and second mold sides 225, 227 are held together under pressure by the clamping unit 214. The clamping unit 214 applies a clamping force during the molding process that is greater than the force exerted by the injection pressure acting to separate the two mold halves 225, 227, thereby holding together the first and second mold sides 225, 227 while the molten plastic material 224 is injected into the mold cavity 232. To support these clamping forces, the clamping unit 214 may be attached to a mold frame and a mold base.

Once the shot of molten plastic material 224 is injected into the mold cavity 232, the reciprocating screw 222 stops traveling forward. The molten plastic material 224 takes the form of the mold cavity 232 and the molten plastic material 224 cools inside the mold 228 until the plastic material 224 solidifies. Once the plastic material 224 has solidified, the clamping unit 214 releases the first and second mold sides 225, 227, the first and second mold sides 225, 227 are separated from one another, and the finished molded object may be ejected from the mold 228. The mold 228 may include a plurality of mold cavities 232 to increase overall production rates. The shapes of the cavities of the plurality of mold cavities may be identical, similar, or different from each other. (The latter may be considered a family of mold cavities).

A native controller 202 is in signal communication with the machine 210, as illustrated by a controller connection 202-c and a machine connection 210-c (with intermediate portions omitted). The native controller 202 is in signal communication with a sensor 252 for measuring the molten plastic material 224 in the nozzle 226, and with a sensor 253 for measuring the molten plastic material 224 at an end of the mold cavity 232.

In the embodiment of FIG. 2, the sensor 252 measures (directly or indirectly) one or more characteristics of the molten plastic material 224 in the nozzle 226. The sensor 252 may or may not be located near, at, or in the nozzle 226. The sensor 252 may measure any characteristics of the molten plastic material 224 that are known in the art, such as pressure, temperature, viscosity, flow rate, etc. or one or more of any other characteristics that are indicative of any of these. The sensor 252 may or may not be in direct contact with the molten plastic material 224. The sensor 252 generates a signal that is transmitted to an input of the native controller 202. If the sensor 252 is not located within the nozzle 226, the native controller 202 can be set, configured, and/or programmed with logic, commands, and/or executable program instructions to provide appropriate correction factors to estimate or calculate values for the measured characteristic in the nozzle 226. In various embodiments, two or more sensors of different types may be used in place of the sensor 252.

In the embodiment of FIG. 2, the sensor 253 measures (directly or indirectly) one or more characteristics of the molten plastic material 224 to detect its presence and/or condition in the mold cavity 232. The sensor 252 may or may not be located near, at, or in the cavity 232. In various embodiments, the sensor 253 can be located at or near an end-of-fill position in the mold cavity 232. For example, the sensor 253 can be located anywhere within the last 30% of the end-of-fill position in the mold cavity 232. The sensor 253 may measure any characteristics of the molten plastic material 224 that is known in the art, such as pressure, temperature, viscosity, flow rate, etc. or one or more of any other characteristics that are indicative of any of these. The sensor 253 may or may not be in direct contact with the molten plastic material 224. The sensor 253 generates a signal that is transmitted to an input of the native controller 202. If the sensor 252 is not located at the end-of-fill position in the mold cavity 232, the native controller 202 can be set, configured, and/or programmed with logic, commands, and/ or executable program instructions to provide appropriate correction factors to estimate or calculate values for the measured characteristic at the end-of-fill position. In various embodiments, two or more sensors of different types may be used in place of the sensor 253.

The native controller 202 is also in signal communication with the screw control 236. In the embodiment of FIG. 2, the native controller 202 generates a signal that is transmitted from an output of the native controller 202 to the screw control 236. The native controller 202 can control injection pressures in the machine 210, by controlling the screw control 236, which controls the rates of injection by the injection unit 212. The controller 202 can command the screw control 236 to advance the screw 222 at a rate that maintains a desired melt pressure of the molten plastic material 224 in the nozzle 226.

This signal from the controller 202 may generally be used to control the molding process, such that variations in material viscosity, mold temperatures, melt temperatures, and other variations influencing filling rate, are taken into account by the controller 202. Adjustments may be made by the controller 202 immediately during the molding cycle, or corrections can be made in subsequent cycles. Furthermore, several signals, from a number of cycles can be used as a basis for making adjustments to the molding process by the controller 202. The controller 202 may be connected to the sensor 252, and/or the sensor 253, and/or the screw control 236 via any type of signal communication known in the art.

The injection molding machine 210 also includes a pressure relief mechanism 245, which relieves pressure in the machine 210 if an injection pressure of the machine 210 exceeds a maximum retrofit safe pressure setting. The pressure relief mechanism 245 is located near the nozzle 226, but can be located at various convenient locations on the machine.

FIG. 3 is an illustration of parts of the native controller 202 of FIG. 2, according to the prior art. The native controller 202 includes hardware 202-$h$, software 202-$s$, inputs 202-$i$, outputs 202-$o$, and a connection 202-$c$. The hardware 202-$h$ includes memory that stores the software 202-$s$ and one or more processors that execute the software 202-$s$. The software 202-$s$ includes logic, commands, and/or executable program instructions, including logic, commands, and/or executable program instructions for controlling an injection molding machine according to an original mold cycle. The software 202-$s$ includes a maximum programmed retrofit safe pressure, according to embodiments described herein. The software 202-$s$ may or may not include an operating system, operating environment, application environment, and/or user interface. The hardware 202-$h$ uses the inputs 202-$i$ to receive signals, data, and/or information from the injection molding machine being controlled by the native controller 202. The hardware 202-$h$ uses the outputs 202-$o$ to send signals, data, and/or information to the injection molding machine. The connection 202-$c$ represents a pathway through which signals, data, and/or information can be transmitted between the native controller 202 and its injection molding machine. In various embodiments this pathway may be a physical connection or a non-physical communication link that works analogous to a physical connection, direct or indirect, configured in any way described herein or known in the art. In various embodiments, a native controller can be configured in any additional or alternate way known in the art.

Figure 4:
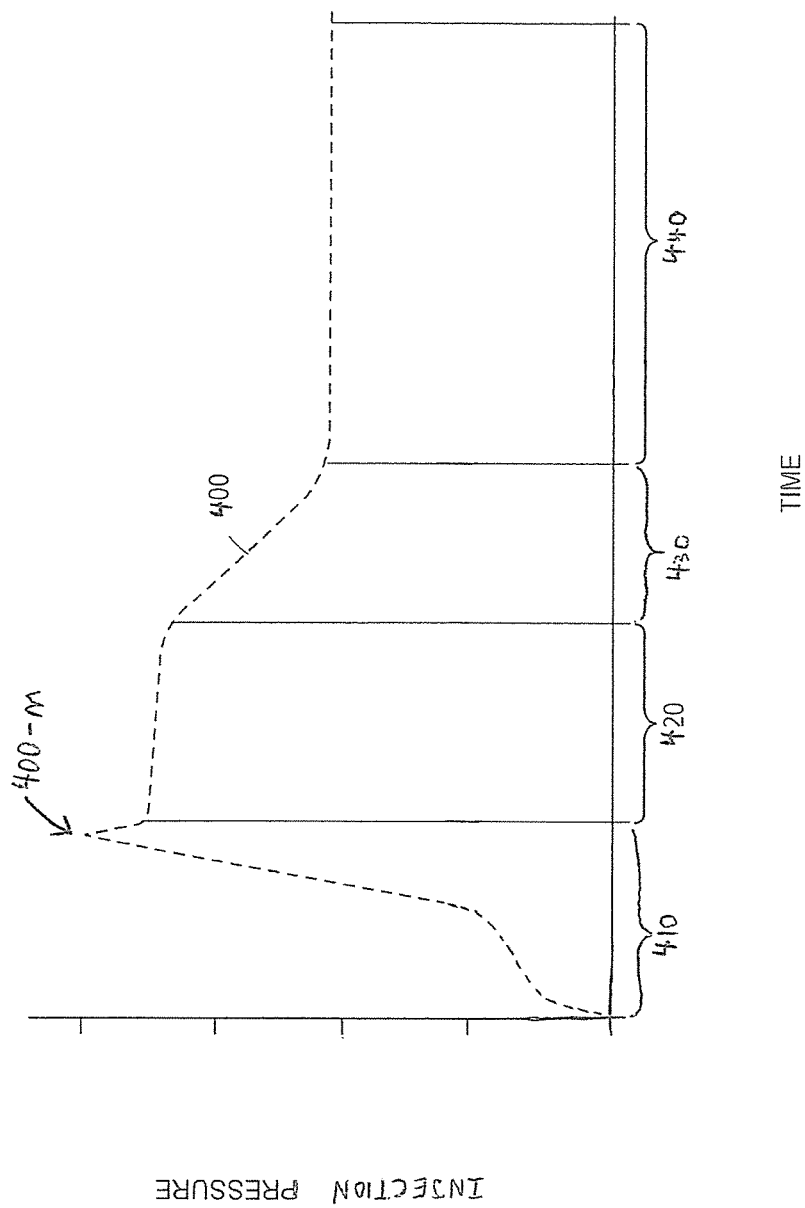
FIG. 4 is a chart of injection pressures during injection of the original injection mold cycle of FIG. 1, according to the prior art.

FIG. 4 is a chart of injection pressures 400 during plastic injection of the original injection mold cycle 100 of FIG. 1, according to the prior art. The chart illustrates injection pressure (measured in the nozzle) on the vertical axis and time on the horizontal axis. The chart shows how the injection pressure changes over time, in the mold cycle, when controlled by a native controller, such as the native controller 202 of FIGS. 2 and 3. The chart also shows the following portions of the original mold cycle: initial injecting 410, filling 420, packing 430, and holding 440. The initial injecting 410 begins with the start of the injection, shows a rapid increase in injection pressure, and ends once the rapid increase in pressure (including any overshoot/undershoot) has completed. In FIG. 4, the initial injecting 410 includes a maximum original injection pressure 400-$m$. The filling 420 begins immediately after the initial injecting 410, shows a relatively high injection pressure, and ends once the mold cavity/cavities is/are volumetrically filled with molten plastic. The packing 430 begins immediately after the filling 420, shows a gradually decreasing injection pressure, and ends once the mold cavity/cavities have taken the proper mass of plastic. The holding 440 begins immediately after the packing 430, shows a relatively low pressure, and ends once the mold is depressurized, usually by or at the step of opening the mold. In various embodiments, injection pressures of an original mold cycle can be configured in any additional or alternate way known in the art.

Figure 5A:
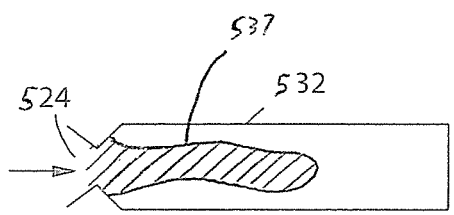
FIG. 5A is a cut-away view of a molten plastic material being injected into a mold cavity at high pressure, as known in the prior art, at a first point in time.
Figure 5B:
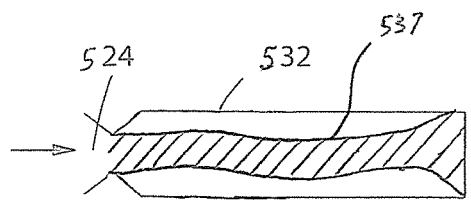
FIG. 5B is a view of the injecting of FIG. 5A, at a second point in time.
Figure 5C:
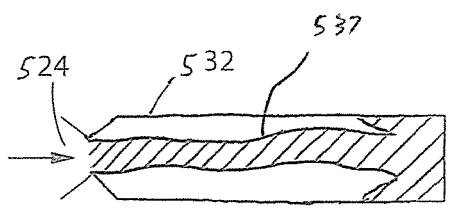
FIG. 5C is a view of the injecting of FIG. 5A, at a third point in time.
Figure 5D:
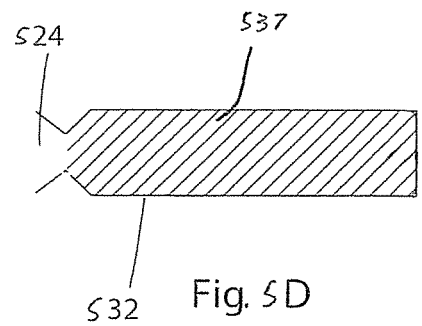
FIG. 5D is a view of the injecting of FIG. 5A, at a fourth point in time.

FIGS. 5A-5D illustrate cut-away views of a molten plastic material 524 being injected into a mold cavity 532 at high pressure, such that a flow 537 of the plastic material 524 experiences "jetting" as known in the prior art. FIG. 5A is a view at a first point in time; FIG. 5B is a view at a second point in time; FIG. 5C is a view at a third point in time; and FIG. 5D is a view of at a fourth point in time. As shown in FIGS. 5A-5D, during injection the flow 537 initially travels through the cavity 532 while having little to no contact with walls of the cavity 532 (FIG. 5A) until the flow 537 reaches the back of the cavity 532 (FIG. 5B) and then fills it (FIGS. 5C and 5D). Since jetting provides poor contact between the flow of molten plastic and the surface of the mold cavity, jetting can lead to rougher and less consistent filling, which can contribute to poor quality for the molded object. Poor contact can lead to poor heat-transfer between the molten plastic and the mold, which can result in slower cooling. Slower cooling can lead to slower mold cycle times and thus, less throughput for the machine. Thus, injecting molding by injecting at high pressures, which can cause jetting, is undesirable.

Figure 6A:
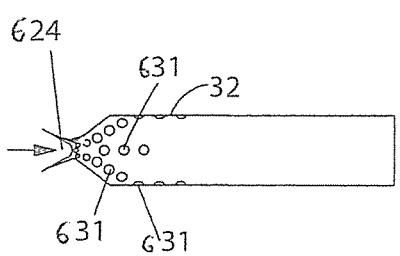
FIG. 6A is a cut-away view of a molten plastic material being injected into a mold cavity at variable pressure, as known in the prior art, at a first point in time.
Figure 6B:
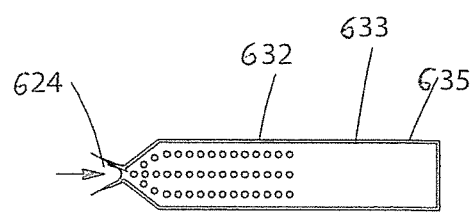
FIG. 6B is a view of the injecting of FIG. 6A, at a second point in time.
Figure 6C:
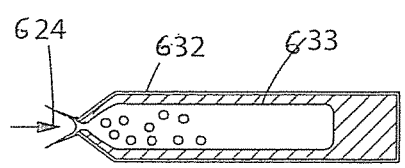
FIG. 6C is a view of the injecting of FIG. 6A, at a third point in time.
Figure 6D:
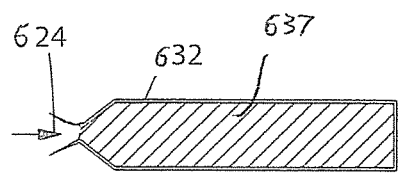
FIG. 6D is a view of the injecting of FIG. 6A, at a fourth point in time.

FIGS. 6A-6D illustrate cut-away views of a molten plastic material 624 being injected into a mold cavity 632 at variable pressure, such that a flow 637 of the plastic material 624 is in the form of droplets and/or globules of molten plastic that are essentially sprayed into the cavity 632, as known in the prior art. FIG. 6A is a view at a first point in time; FIG. 6B is a view at a second point in time; FIG. 6C is a view at a third point in time; and FIG. 6D is a view of at a fourth point in time. As shown in FIGS. 6A-6D, during injection the flow 637 initially travels through the cavity 632 while having little to no contact with walls of the cavity 632 (FIGS. 6A and 6B) until the flow 637 reaches the back of the cavity and begins to accumulate on the walls of the cavity (FIG. 6C), finally filling it (FIG. 6D). Since spraying droplets and/or globules provides poor contact between the flow of molten plastic and the surface of the mold cavity, spraying can lead to rougher and less consistent filling, which can contribute to poor quality for the molded object. Poor contact can lead to poor heat-transfer between the molten plastic and the mold, which can result in slower cooling. Slower cooling can lead to slower mold cycle times and thus, less throughput for the machine. Thus, injecting molding by injecting at variable pressures, which can cause spraying of the molten plastic, is undesirable.

Figure 7A:
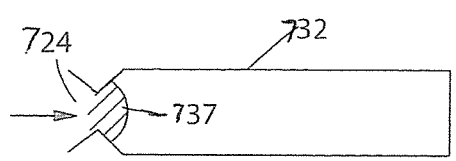
FIG. 7A is a cut-away view of a molten plastic material being injected into a mold cavity, wherein the material is filling the cavity at substantially constant pressure, at a first point in time.
Figure 7B:
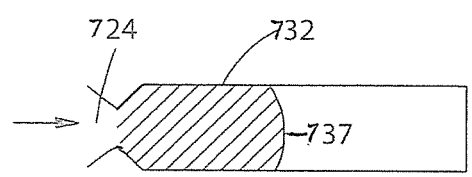
FIG. 7B is a view of the injecting of FIG. 7A, at a second point in time.
Figure 7C:
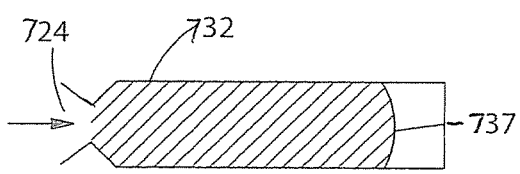
FIG. 7C is a view of the injecting of FIG. 7A, at a third point in time.
Figure 7D:
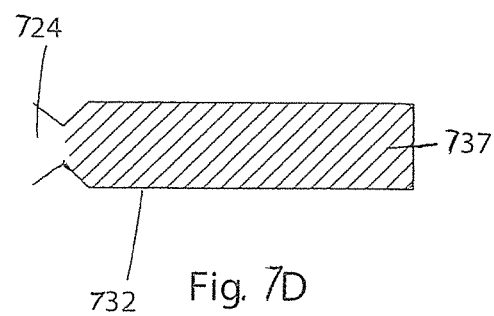
FIG. 7D is a view of the injecting of FIG. 7A, at a fourth point in time.

FIGS. 7A-7D illustrate cut-away views of a molten plastic material 724 being injected into a mold cavity 732 at relatively lower, substantially constant pressure, such that a flow 737 of the plastic material 724 experiences a substantially unbroken, continuously advancing melt front. FIG. 7A is a view at a first point in time; FIG. 7B is a view at a second point in time; FIG. 7C is a view at a third point in time; and FIG. 7D is a view of at a fourth point in time. As shown in FIGS. 7A-7D, during injection the flow 737 progresses through the cavity 732 while having substantial contact with walls of the cavity 532 from the front of the cavity 732 to the back of the cavity 732 throughout the filling.

As discussed above, operating at substantially constant pressures provides better melt flow through the mold cavity and better contact between the molten plastic and the surface of the mold cavity. Better melt flow can lead to smoother and more consistent filling, which improves the quality of the molded object. Better contact can lead to better heat-transfer between the molten plastic and the mold. Better heat transfer can ensure that plastic remains molten throughout the filling (avoiding 'freeze-off' problems). Better heat transfer can also provide faster cooling. Faster cooling can lead to faster mold cycle times and thus, greater throughput for the machine. Thus, injecting molding by injecting at relatively lower, substantially constant pressures, which can cause this kind of melt flow, is desirable.

FIGS. 8-11 are exemplary charts of injection pressures during injection of retrofit mold cycles.

Figure 8:
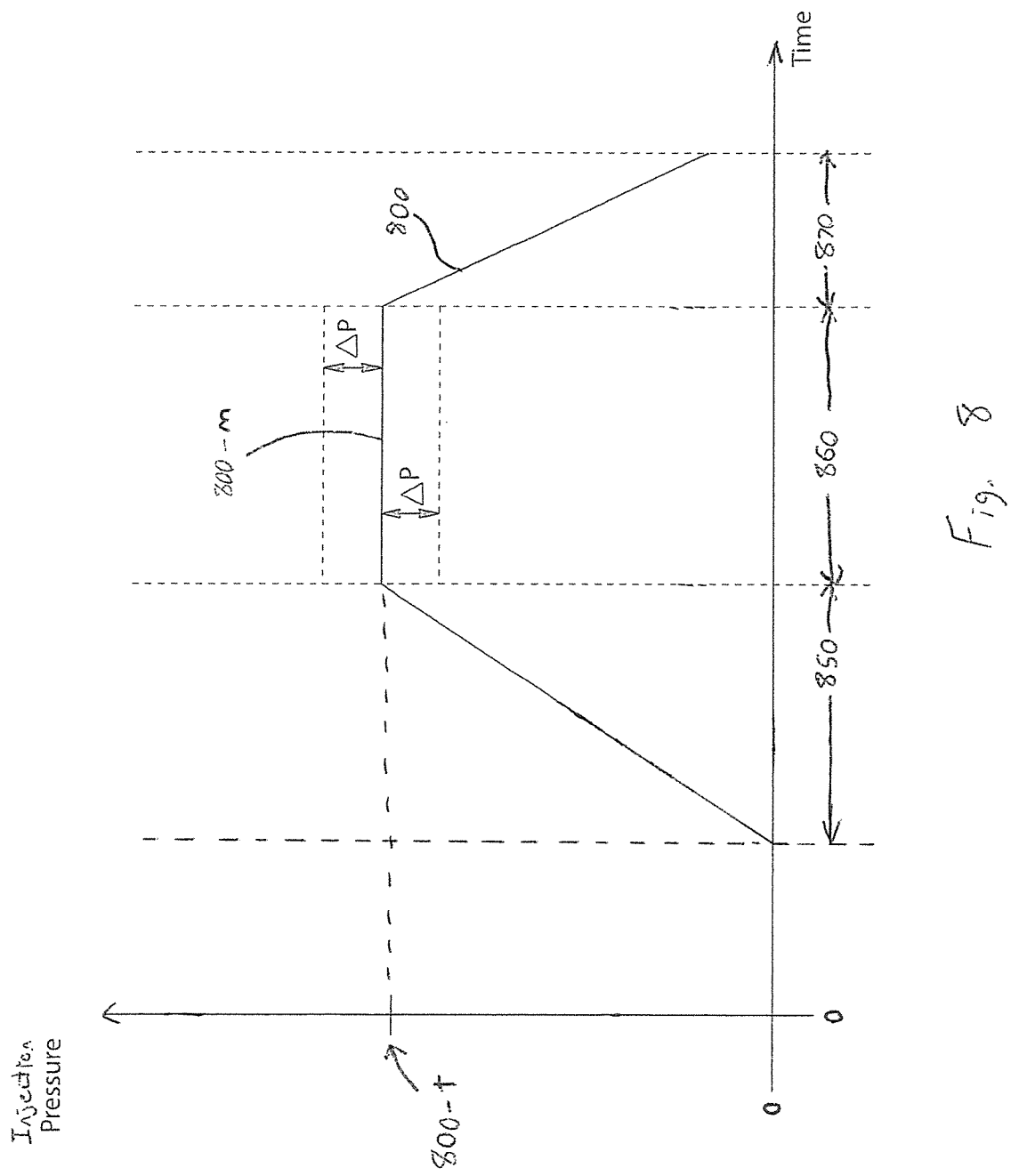
FIG. 8 is a chart of injection pressures during injection of an exemplary retrofit mold cycle, wherein during a filling portion of the injection, the injection pressure is controlled to be constant.
Figure 14:
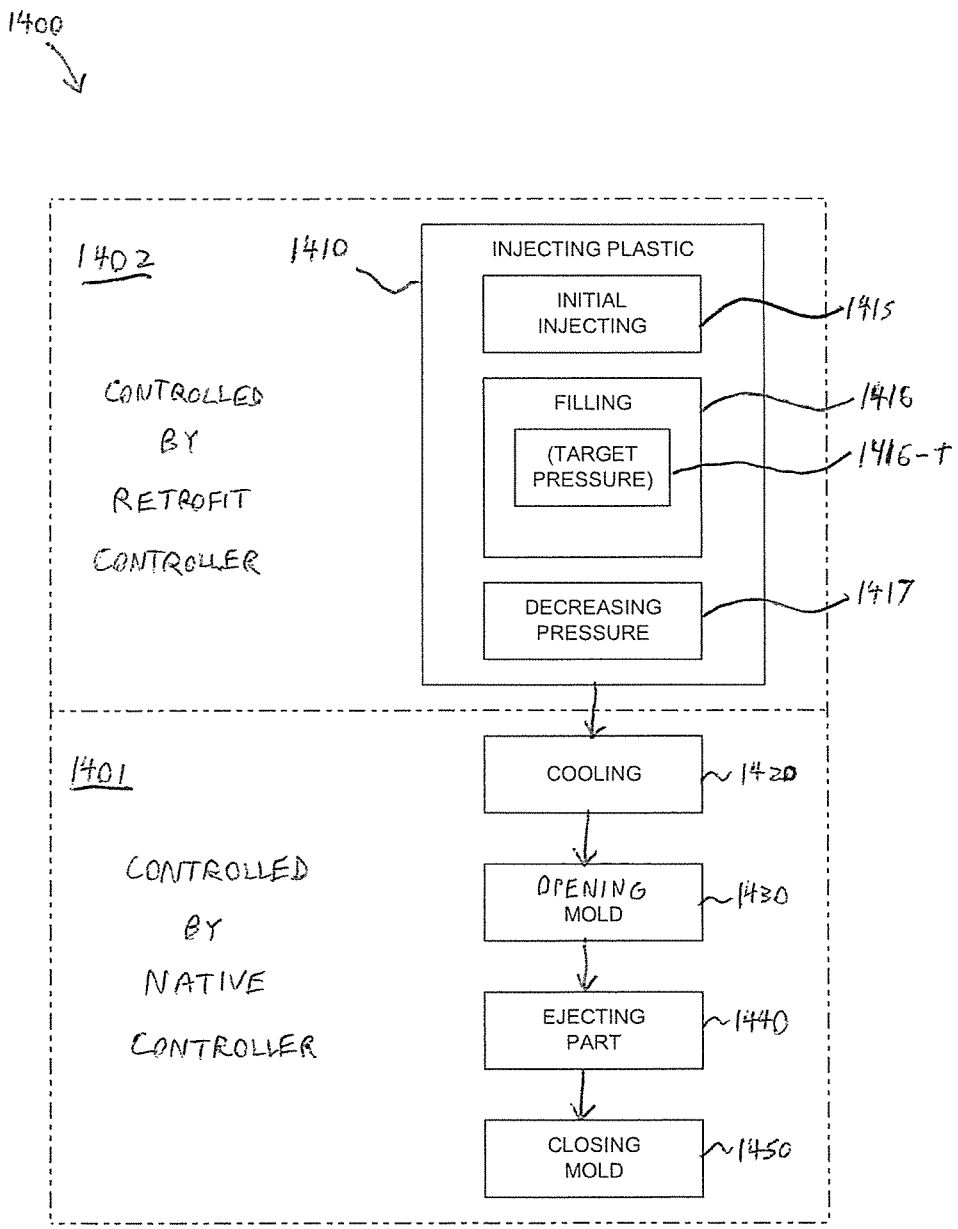
FIG. 14 is an illustration of a retrofit injection mold cycle, as programmed on the native controller and the retrofit controller of FIG. 13, for controlling the retrofitted injection molding machine of FIG. 13.

FIG. 8 is a chart of injection pressures 800 during injection of an exemplary retrofit mold cycle, such as the retrofit mold cycle 1400 of FIG. 14, wherein during a filling portion 860 of the injection, the injection pressure is controlled to be at least substantially constant. The chart illustrates injection pressure (measured in the nozzle) on the vertical axis and time on the horizontal axis. The chart shows how the injection pressure changes over time, in the retrofit mold cycle, when controlled by a retrofit controller, such as the retrofit controller 1202 of FIG. 12. The chart also shows three portions of the retrofit mold cycle: initial injecting 850, the filling 860, and decreasing pressure 870. The initial injecting 850 begins with the start of the injection, includes a rapid increase in injection pressure, and ends once the rapid increase in pressure (including any overshoot/undershoot) has completed. The filling 860 begins immediately after the initial injecting 850 and includes a relatively lower (with respect to an original mold cycle), constant injection pressure. During the filling 860, a retrofit controller controls the injection pressure with respect to a retrofit target injection pressure 800-$t$, as described herein. In various embodiments, during at least part (e.g. 50-100%) of the filling 860, the injection pressure varies by less than a retrofit percentage (e.g. +/−0-30%) shown on the chart as $\Delta P$, with respect to the retrofit target injection pressure 800-$t$. In FIG. 8, the filling 860 includes a maximum retrofit injection pressure 800-$m$, which corresponds with the retrofit target injection pressure 800-$t$, and is located throughout the filling portion 860. The maximum retrofit injection pressure 800-$m$ can be less than (e.g. 10-60% less than) an original maximum original injection pressure, for an original mold cycle, as described herein. The filling 860 continues until the mold cavity/cavities is/are substantially volumetrically filled (e.g. 70-100% filled) with molten plastic, and ends once the decreasing pressure 870 portion begins. In various embodiments, the filling can continue until the The decreasing pressure 870 begins immediately after the filling 860, includes a rapidly decreasing injection pressure, and ends once the mold is depressurized, usually by or at the step of opening the mold. In various embodiments, injection pressures of the retrofit mold cycle shown in FIG. 8 can be configured in any way described herein.

Figure 9:
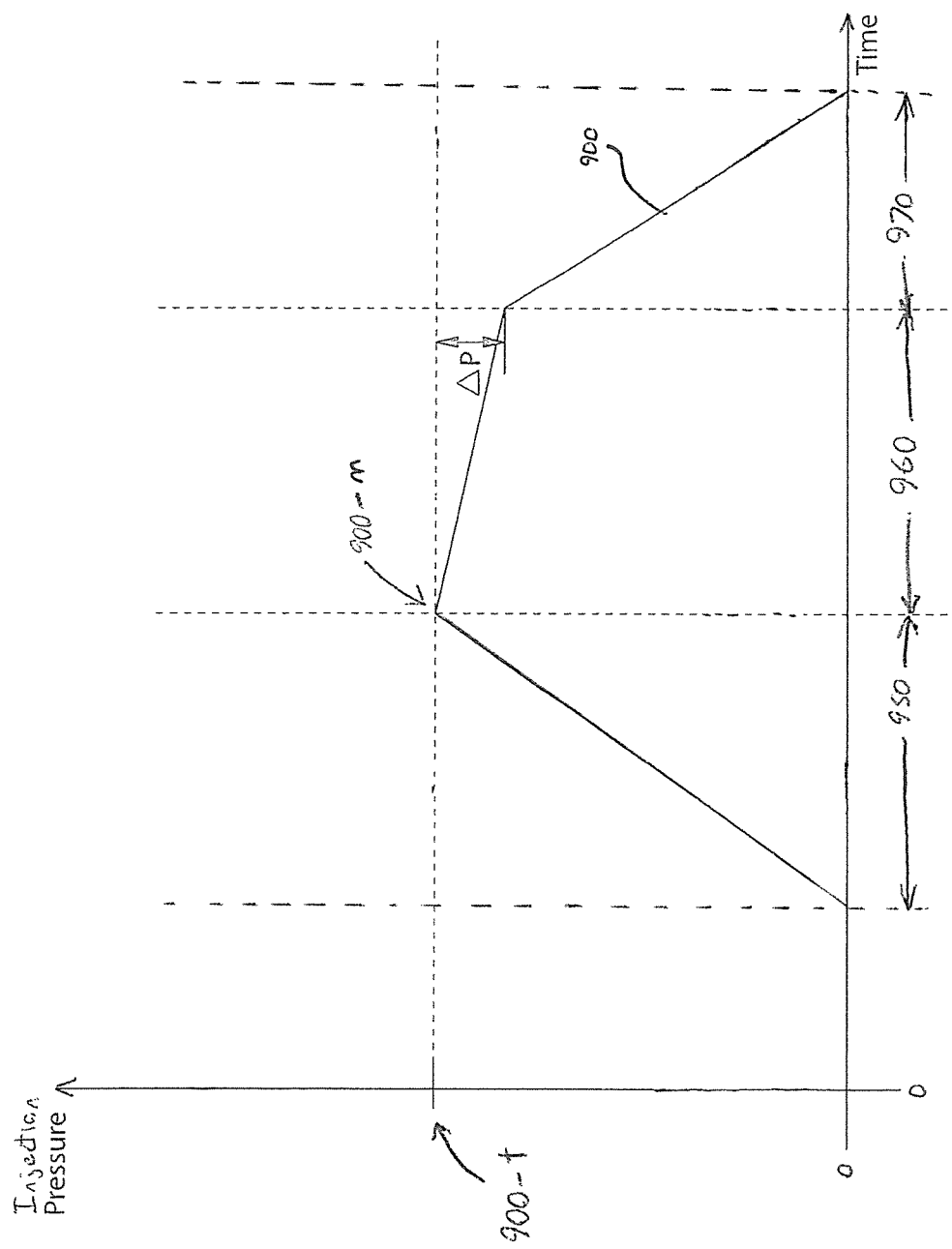
FIG. 9 is a chart of injection pressures during injection of an exemplary retrofit mold cycle, wherein during a filling portion of the injection, the injection pressure is falling, but still controlled to be substantially constant.

FIG. 9 is a chart of injection pressures 900 during injection of an exemplary retrofit mold cycle, such as the retrofit mold cycle 1400 of FIG. 14, wherein during a filling portion 960 of the injection, the injection pressure is decreasing, but still controlled to be substantially constant. The chart illustrates injection pressure (measured in the nozzle) on the vertical axis and time on the horizontal axis. The chart shows how the injection pressure changes over time, in the retrofit mold cycle, when controlled by a retrofit controller, such as the retrofit controller 1202 of FIG. 12. The chart also shows three portions of the retrofit mold cycle: initial injecting 950, the filling 960, and decreasing pressure 970. The initial injecting 950 begins with the start of the injection, includes a rapid increase in injection pressure, and ends once the rapid increase in pressure (including any overshoot/undershoot) has completed. The filling 960 begins immediately after the initial injecting 950 and includes a relatively low (with respect to an original mold cycle), gradually falling injection pressure that is still substantially constant. During the filling 960, a retrofit controller controls the injection pressure with respect to a retrofit target injection pressure 900-$t$, as described herein. In various embodiments, during at least part (e.g. 50-100%) of the filling 960, the injection pressure varies by less than a retrofit percentage (e.g. +/−0-30%) with a 30% decrease variation shown on the chart as $\Delta P$, with respect to the retrofit target injection pressure 900-$t$. In FIG. 9, the filling 960 includes a maximum retrofit injection pressure 900-m, which corresponds with the retrofit target injection pressure 900-t, and is located at the beginning of the filling portion 960. The maximum retrofit injection pressure 900-m can be less than (e.g. 10-60% less than) an original maximum original injection pressure, for an original mold cycle, as described herein. The filling 960 continues until the mold cavity/cavities is/are substantially volumetrically filled (e.g. 70-100% filled) with molten plastic, and ends once the decreasing pressure 870 portion begins. The decreasing pressure 970 begins immediately after the filling 960, includes a rapidly decreasing injection pressure, and ends once the mold is depressurized, usually by or at the step of opening the mold. In various embodiments, injection pressures of the retrofit mold cycle shown in FIG. 9 can be configured in any way described herein.

Figure 10:
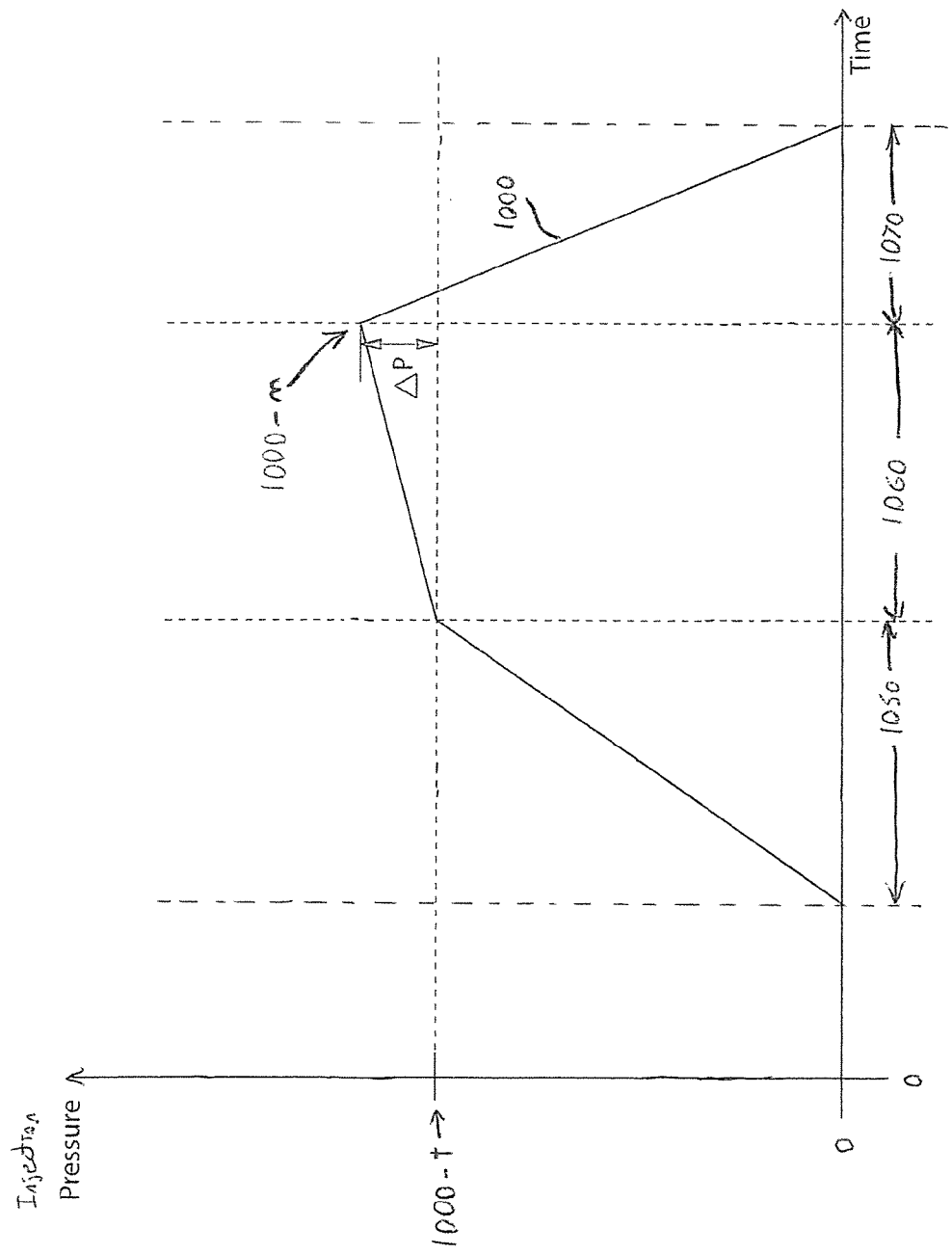
FIG. 10 is a chart of injection pressures during injection of an exemplary retrofit mold cycle, wherein during a filling portion of the injection, the injection pressure is rising, but still controlled to be substantially constant.

FIG. 10 is a chart of injection pressures 1000 during injection of an exemplary retrofit mold cycle, such as the retrofit mold cycle 1400 of FIG. 14, wherein during a filling portion 1060 of the injection, the injection pressure is increasing, but still controlled to be substantially constant. The chart illustrates injection pressure (measured in the nozzle) on the vertical axis and time on the horizontal axis. The chart shows how the injection pressure changes over time, in the retrofit mold cycle, when controlled by a retrofit controller, such as the retrofit controller 1202 of FIG. 12. The chart also shows three portions of the retrofit mold cycle: initial injecting 1050, the filling 1060, and decreasing pressure 1070. The initial injecting 1050 begins with the start of the injection, includes a rapid increase in injection pressure, and ends once the rapid increase in pressure (including any overshoot/undershoot) has completed. The filling 1060 begins immediately after the initial injecting 1050, and includes a relatively low (with respect to an original mold cycle), gradually rising injection pressure that is still substantially constant. During the filling 1060, a retrofit controller controls the injection pressure with respect to a retrofit target injection pressure 1000-t, as described herein. In various embodiments, during at least part (e.g. 50-100%) of the filling 1060, the injection pressure varies by less than a retrofit percentage (e.g. +/−0-30%) with a 30% increase variation shown on the chart as ΔP, with respect to the retrofit target injection pressure 1000-t. In FIG. 10, the filling 1060 includes a maximum retrofit injection pressure 1000-m, which corresponds with the retrofit target injection pressure 1000-t, and is located at the end of the filling portion 1060. The maximum retrofit injection pressure 1000-m can be less than (e.g. 10-60% less than) an original maximum original injection pressure, for an original mold cycle, as described herein. The filling 1060 continues until the mold cavity/cavities is/are substantially volumetrically filled (e.g. 70-100% filled) with molten plastic, and ends once the decreasing pressure 1070 portion begins. The decreasing pressure 1070 begins immediately after the filling 1060, includes a rapidly decreasing injection pressure, and ends once the mold is depressurized, usually by or at the step of opening the mold. In various embodiments, injection pressures of the retrofit mold cycle shown in FIG. 10 can be configured in any way described herein.

Figure 11:
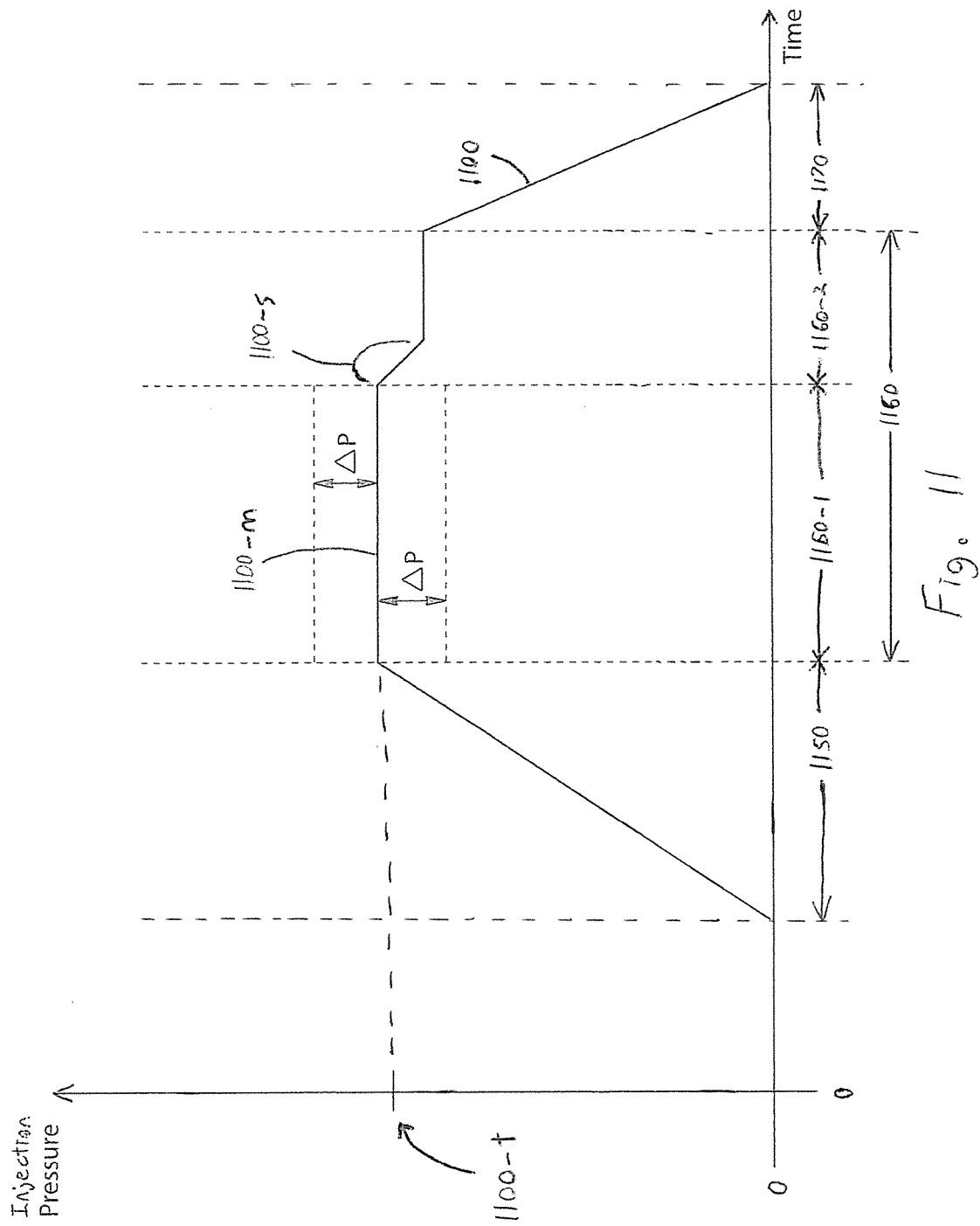
FIG. 11 is a chart of injection pressures during injection of an exemplary retrofit mold cycle, wherein during a filling portion of the injection, the injection pressure experiences a step-change, but is still controlled to be substantially constant.

FIG. 11 is a chart of injection pressures 1100 during injection of an exemplary retrofit mold cycle, such as the retrofit mold cycle 1400 of FIG. 14, wherein during a filling portion 1160 of the injection, the injection pressure experiences a step-change, but is still controlled to be substantially constant. The chart illustrates injection pressure (measured in the nozzle) on the vertical axis and time on the horizontal axis. The chart shows how the injection pressure changes over time, in the retrofit mold cycle, when controlled by a retrofit controller, such as the retrofit controller 1202 of FIG. 12. The chart also shows three portions of the retrofit mold cycle: initial injecting 1150, the filling 1160, which includes a first part of the filling 1160-1 and a second part of the filling 1160-2, and decreasing pressure 1170. The initial injecting 1150 begins with the start of the injection, includes a rapid increase in injection pressure, and ends once the rapid increase in pressure (including any overshoot/undershoot) has completed. The filling 1160 begins immediately after the initial injecting 1150, includes the first part of the filling 1160-1 having a relatively low (with respect to an original mold cycle), constant injection pressure that then steps down 1100-s to the second part of the filling 1160-2 having an even lower, constant injection pressure. During the filling 1160, a retrofit controller controls the injection pressure with respect to a retrofit target injection pressure 1100-t, as described herein. In various embodiments, during at least part (e.g. 50-100%) of the filling 1160, the injection pressure varies by less than a retrofit percentage (e.g. +/−0-30%) shown on the chart as ΔP, with respect to the retrofit target injection pressure 1100-t. In FIG. 11, the filling 1160 includes a maximum retrofit injection pressure 1100-m, which corresponds with the retrofit target injection pressure 1100-t, and is located throughout the first part of the filling 1160-1. The maximum retrofit injection pressure 1100-m can be less than (e.g. 10-60% less than) an original maximum original injection pressure, for an original mold cycle, as described herein. The filling 1160 continues until the mold cavity/cavities is/are substantially volumetrically filled with molten plastic, and ends once the decreasing pressure 1170 portion begins. As used herein, substantially filled means at least 70% filled and can include various ranges such as: 75-100%, 80-100% filled, 85-100% filled, 90-100% filled, 95-100% filled, and the like. The decreasing pressure 1170 begins immediately after the filling 1160, includes a rapidly decreasing injection pressure, and ends once the mold is depressurized, usually by or at the step of opening the mold. In various embodiments, injection pressures of the retrofit mold cycle shown in FIG. 11 can be configured in any way described herein.

Figure 12:
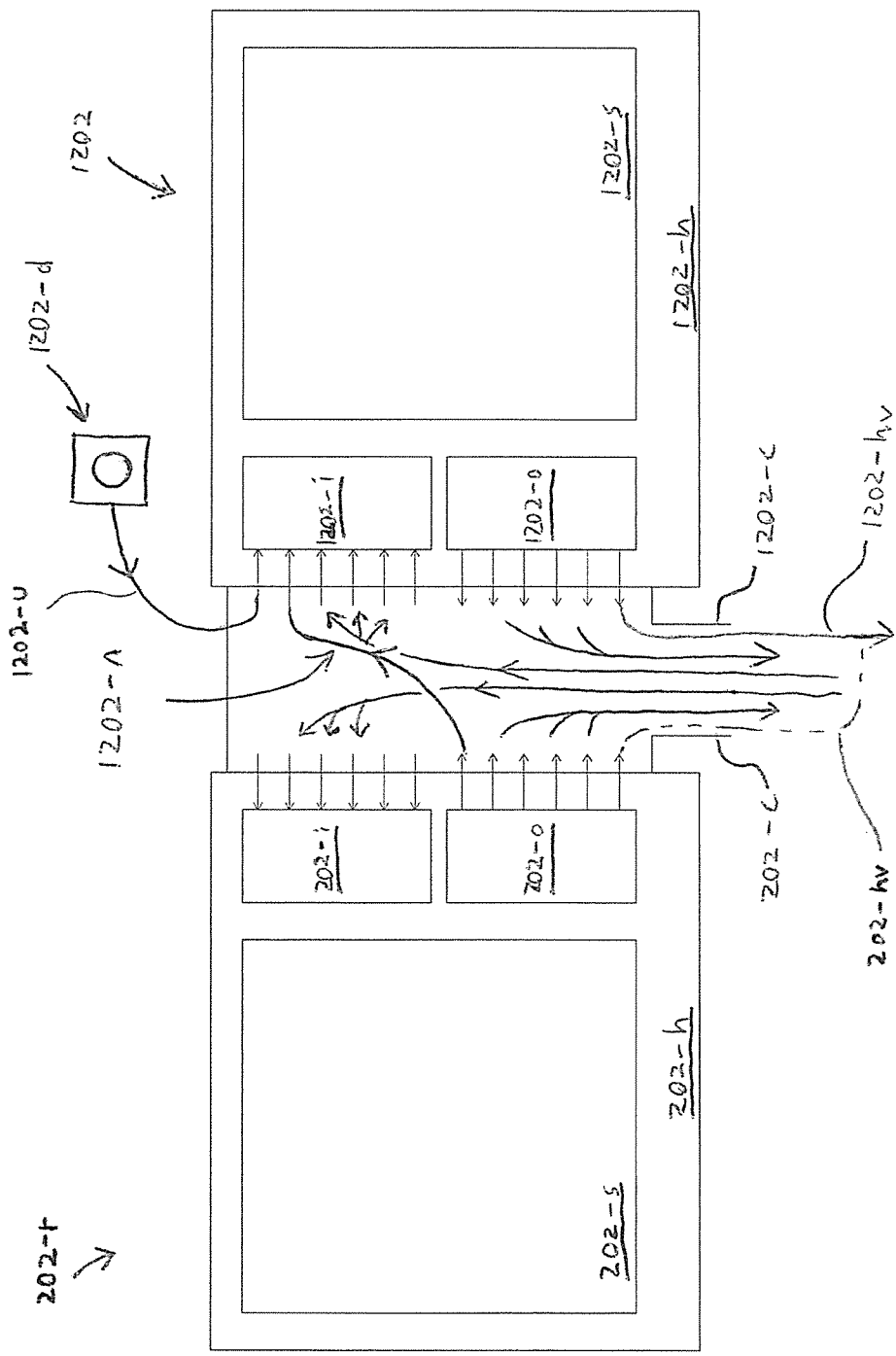
FIG. 12 is an illustration of parts of a retrofitted native controller along with a retrofit controller, according to embodiments of retrofitting disclosed herein.

FIG. 12 is an illustration of parts of a retrofitted native controller 202-r along with a retrofit controller 1202, according to embodiments of retrofitting disclosed herein. The retrofitted native controller 202-r is the same as the native controller 202 of FIGS. 2 and 3, with like-numbered elements configured in the same way, except as described below. The retrofit controller 1202 is generally similar to the native controller 202, with like-numbered elements configured in the same way, except as described below.

In the software 202-s, the maximum programmed retrofit safe pressure is reprogrammed to a maximum programmed revised safe pressure setting, according to embodiments described herein. In the retrofit controller 1202, software 1202-s includes logic, commands, and/or executable program instructions for controlling an injection molding machine according to a retrofit mold cycle, such as the retrofit injection mold cycle 1400 of FIG. 14. And, the software 1202-s is programmed with a maximum programmed retrofit safe pressure setting, according to embodiments described herein.

The connection 202-c is illustrated as being in common with a connection 1202-c, wherein the common connection represents a pathway through which signals, data, and/or information can be transmitted and/or received: a) between the retrofitted native controller 202-r and the injection molding machine, b) between the retrofit controller 1202 and the injection molding machine, and c) between the retrofitted native controller 202-r and the retrofit controller 1202. In various embodiments these pathways may be physical connections or non-physical communication links that work analogous to physical connections, direct or indirect, configured in any way described herein or known in the art. In various embodiments, a retrofitted native controller and a retrofit controller can be configured in any additional or alternate way known in the art.

FIG. 12 illustrates connecting a particular output from the retrofitted native controller 202-r, which is used as a particular input to the retrofit controller 1202. In various embodiments disclosed herein, this portion of the retrofitting includes establishing signal communication between: a) an inject forward output 1202-n from outputs 202-o of the retrofitted native controller 202-r, and b) one of the inputs 1202-i of the retrofit controller 1202. The retrofitted native controller 202-r can be set, configured, and/or programmed with logic, commands, and/or executable program instructions such that the inject forward output 1202-n signals when the plastic injecting should (and/or should not) occur during a mold cycle of the molding machine. As an example, the retrofitted native controller 202-r can turn "on" the inject forward output 1202-n when the plastic injecting should occur, and can turn "off" the inject forward output 1202-n when the plastic injecting should not occur. The retrofit controller 1202 can use the state of the inject forward output 1202-n as a condition for injecting plastic in the retrofit mold cycle. This signal communication allows the retrofitted native controller 202-r to hand-off control of the plastic injection to the retrofit controller 1202 for the plastic injecting portion of the retrofit mold cycle. In various embodiments, this hand-off can be accomplished by the retrofitted native controller 202-r sending to the retrofit controller 1202 one or more additional or alternate signals, data, and/or information, which are functionally equivalent to an inject forward output, in any workable way known in the art.

FIG. 12 also illustrates moving a particular output from the retrofitted native controller 202-r to the retrofit controller 1202. In various embodiments disclosed herein, this portion of the retrofitting includes: a) disconnecting signal communication between an injection control output 202-hv of the retrofitted native controller 202-r and a control input of an injection unit of the molding machine (signal illustrated by a phantom line), and b) establishing signal communication between an injection control output 1202-hv of the retrofit controller 1202 and the control input of the injection unit of the molding machine (signal illustrated by a solid line). The retrofit controller 1202 can be set, configured, and/or programmed with logic, commands, and/or executable program instructions such that the injection control output 1202-hv signals the injection unit regarding the rate at which injecting should occur during plastic injecting of a retrofit mold cycle of the retrofitted the molding machine. As an example, the retrofit controller 1202 can generate the injection control output 1202-hv as an analog control voltage, which scales from a particular low value (representing a minimum injection rate) to a particular high value (representing a maximum injection rate). The injection unit can use the state of the inject control output 1202-hv as the input for controlling the rate of injecting plastic in the retrofit mold cycle. The rate of injecting, in turn, directly affects the injection pressure of the molten plastic in the machine. So, the injection control output 1202-hv can effectively be used to control injection pressures in the retrofitted injection molding machine, according to any of the embodiments disclosed herein. This signal communication also allows the retrofit controller 1202 to replace control of the plastic injection by the retrofitted native controller 202-r in the retrofit mold cycle. In various embodiments, the function of the injection control output 1202-hv can be accomplished by the retrofit controller 1202 generating one or more additional or alternate signals, data, and/or information, which are functionally equivalent to an injection control output and/or by sending such to one or more additional or alternate machine components, which partially or fully control the rate of injection in the machine (and/or the effective injection pressure in the machine), in any workable way known in the art. For example, in an alternative embodiment, a retrofit controller could at least partially control injection pressures of the machine, by controlling a rate of melt flow through the nozzle.

In various embodiments, the retrofitting can also include rerouting the disconnected injection control output 202-hv to one of the inputs 1202-i of the retrofit controller 1202, for use as described below.

FIG. 12 further illustrates a disable switch 1202-d, which can be provided with the retrofitting, as described herein, and can allow a user of the retrofitted injection molding machine to select a mode of injection molding that disables the retrofit controller 1202, such that the machine and the native controller mold production versions (i.e. molded objects made using production conditions on the molding machine, wherein the objects have acceptable quality) of the plastic molded object according to the original mold cycle. In various embodiments disclosed herein, this portion of the retrofitting includes establishing signal communication between: a) at least one user-controlled output 1202-u from the disable switch 1202-d, and b) at least one of the inputs 1202-i of the retrofit controller 1202. The retrofit controller 1202 can be set, configured, and/or programmed with logic, commands, and/or executable program instructions such that when the user-controlled output 1202-u provides a particular signal, the retrofit controller 1202 does not control plastic injecting during a mold cycle of the molding machine. As an example, when the user-controlled output 1202-u is turned "on" the injecting function of the retrofit controller 1202 is disabled and does not control the plastic injecting, and when the user-controlled output 1202-u is turned "off" the injecting function of the retrofit controller 1202 is not disabled and does control the plastic injecting. The retrofit controller 1202 can also be set, configured, and/or programmed with logic, commands, and/or executable program instructions such that when the injecting function of the retrofit controller is disabled, the retrofit controller 1202 can receive the control output 202-hv from the retrofitted native controller (as described above) and pass that received signal (in unmodified form or in modified form) to the control input of the injection unit of the molding machine. As a result, when the injecting function of the retrofit controller 1202 is disabled, the retrofitted native controller 202-r can effectively control the plastic injecting (with the passed-through signal) and the retrofitted molding machine can still operate, although using an original mold cycle which is likely to be relatively less efficient then the retrofit mold cycle. In various embodiments, the function of the disable switch 1202-d and the user-controlled output 1202-u can be accomplished by one or more additional or alternate user input devices and/or signals, data, and/or information, which are functionally equivalent, in any workable way known in the art.

Figure 13:
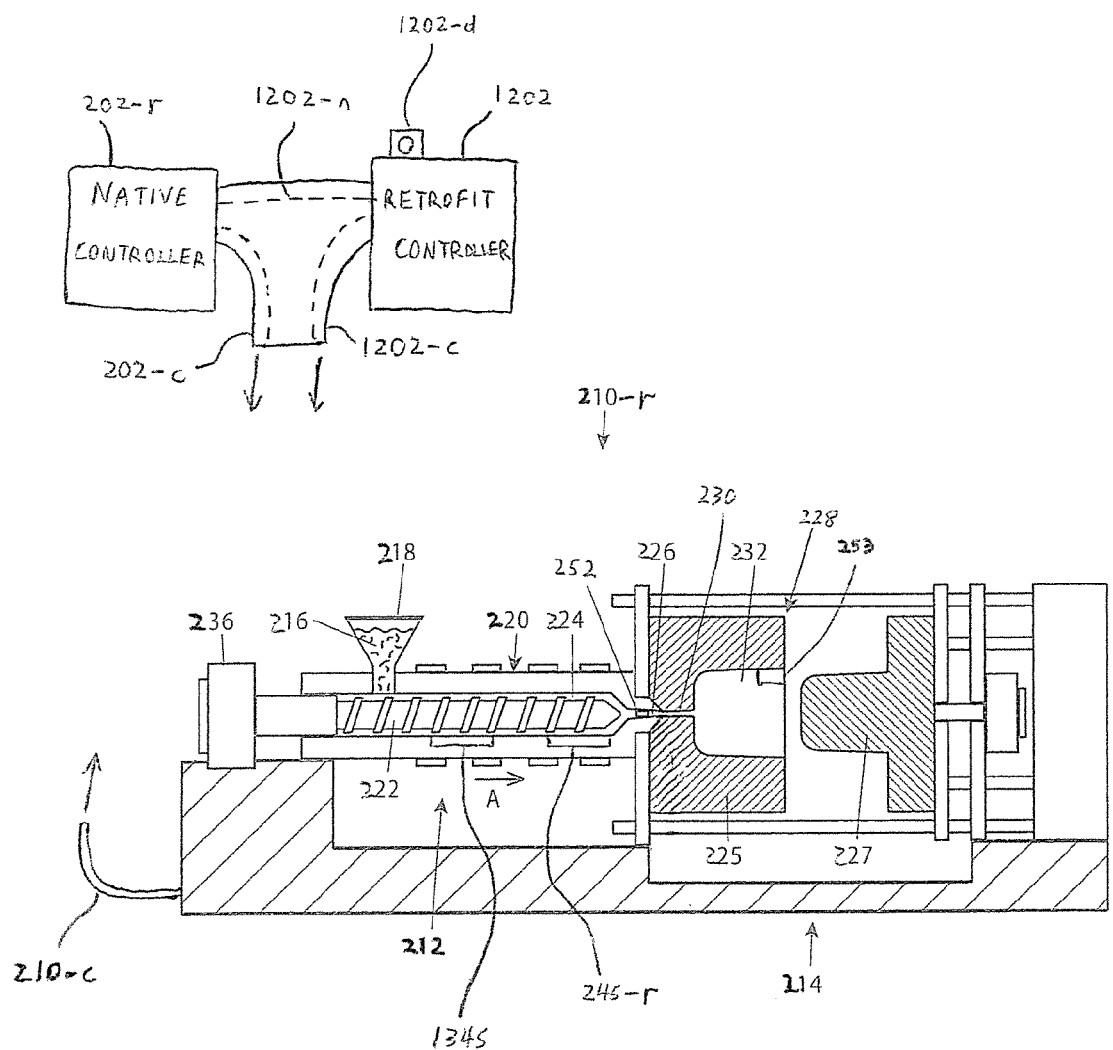
FIG. 13 is an elevation cut-away view of a retrofitted injection molding machine, which is a retrofitted version of the injection molding machine of FIG. 2, controlled by the retrofitted native controller and the retrofit controller of FIG. 12, according to embodiments of retrofitting disclosed herein.

FIG. 13 is an elevation view of a retrofitted injection molding machine 210-r, which is a retrofitted version of the injection molding machine 210 of FIG. 2, controlled by the retrofitted native controller 202-r and the retrofit controller 1202 of FIG. 12, according to embodiments of retrofitting disclosed herein. The retrofitted injection molding machine 210-r includes a retrofitted pressure relief mechanism 245-r, which is reset from a maximum original safe pressure setting to a maximum revised safe pressure setting, according to embodiments described herein. The retrofitted injection molding machine 210-r also includes an additional retrofit pressure relief mechanism 1345, which is set to a maximum retrofit safe pressure setting, according to embodiments described herein.

FIG. 14 is an illustration of a retrofit injection mold cycle 1400, as programmed on the retrofitted native controller 202-r and the retrofit controller 1202 of FIG. 13, for controlling the retrofitted injection molding machine 210-r of FIG. 13. The retrofit mold cycle 1402 includes an operating sequence of injecting molten plastic 1410, according to control 1402 by the retrofit controller 1202, and then performing other functions according to control 1401 by the retrofitted native controller 202-r. The injecting of the molten plastic 1410 includes an initial injecting portion 1415, a filling portion 1416, which includes using a target pressure 1416-t, and a decreasing pressure portion 1417. The retrofitted native controller 202-r and retrofit controller 1202 can use various signal communications, as described herein and known in the art, to share control of the retrofitted injection molding machine 210-r during the retrofit mold cycle.

The injecting of the molten plastic 1410 can be partially or fully performed in any way described herein, for a retrofit mold cycle. As examples, part, parts, substantially all, or all of the initial injecting portion 1415 can be performed according to the initial injecting portion 850 of FIG. 8, the initial injecting portion 950 of FIG. 9, the initial injecting portion 1050 of FIG. 10, or the initial injecting portion 1150 of FIG. 11, or any other embodiments described herein, including any of their alternative embodiments, and any variations known in the art, in any workable combination. Also as examples, part, parts, substantially all, or all of the filling portion 1416 can be performed according to the filling portion 860 of FIG. 8, the filling portion 960 of FIG. 9, the filling portion 1060 of FIG. 10, or the filling portion 1160 of FIG. 11, or any other embodiments described herein, including any of their alternative embodiments, and any variations known in the art, in any workable combination. In particular, the target pressure 1416-t can be selected according to any embodiments described herein, including any alternative embodiments, and according to any way known in the art, in any workable combination. As further examples, part, parts, substantially all, or all of the decreasing pressure portion 1417 can be performed according to the decreasing pressure portion 870 of FIG. 8, the decreasing pressure portion 970 of FIG. 9, the decreasing pressure portion 1070 of FIG. 10, or the decreasing pressure portion 1170 of FIG. 11, or any other embodiments described herein, including any of their alternative embodiments, and any variations known in the art, in any workable combination.

The other functions include cooling the plastic 1420, opening the mold 1430, ejecting the molded object from the mold 1440, and closing the mold 1450, each of which is performed in the same way as the like-numbered functions in the embodiment of FIG. 1. In some alternative embodiments, one or more of these other functions can be modified from its form in FIG. 1 in any way known in the art; in other alternative embodiments, one or more of these other functions can also be partially or fully performed by the retrofit controller 1202.

Thus, embodiments of the present disclosure can be used to improve the operation of a molding machine by changing its original mold cycle to a retrofit mold cycle.

A retrofit mold cycle can allow an injection molding machine to use lower injection pressures, when compared with the original mold cycle. Operating at lower pressures uses less energy, reduces stress on mechanical components, and increases the safety factor for the machine. The machine can use less energy at lower pressures since its injection unit does not need to perform as much work. The reduced stress can lengthen the life of mechanical components and decrease the possibility of their failure. The machine can operate at an increased safety factor, since there will be a relatively greater difference between its operating pressures and the maximum rated pressure for the machine.

A retrofit mold cycle can also allow an injection molding machine to use more constant injection pressures, when compared with the original mold cycle. Operating at more constant pressures provides better melt flow through the mold cavity and better contact between the molten plastic and the surface of the mold cavity. Better melt flow can lead to smoother and more consistent filling, which improves the quality of the molded object. Better contact can lead to better heat-transfer between the molten plastic and the mold. Better heat transfer can ensure that plastic remains molten throughout the filling (avoiding 'freeze-off' problems). Better heat transfer can also provide faster cooling. Faster cooling can lead to faster mold cycle times and thus, greater throughput for the machine.

Part, parts, or all of any of the embodiments disclosed herein can be combined with part, parts, or all of other injection molding embodiments known in the art, including those described below.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of using an injection molding machine, the method comprising:
   first, injection molding using a first injection molding machine, a first mold, and a native controller to injection mold production versions of a plastic object according to an original mold cycle for the first mold, the first injection molding machine including an injection unit, a nozzle in fluid communication with the injection unit, and the first mold, which is in fluid communication with the nozzle, wherein the native controller is programmed with at least a portion of the original mold cycle, wherein the original mold cycle has an original average cycle time, and wherein the native controller at least partially controls injection pressures of the machine according to the original mold cycle; and second, injection molding using a second injection molding machine, a second mold, the native controller, and a secondary, retrofit controller that is distinct from the native controller to injection mold production versions of the plastic object according to a retrofit mold cycle for the second mold, the second injection molding machine including an injection unit, a nozzle in fluid communication with the injection unit, and the second mold, which is in fluid communication with the nozzle, wherein the retrofit controller is programmed with at least a portion of the retrofit mold cycle, wherein the retrofit mold cycle has a retrofit average cycle time, wherein the retrofit controller at least partially controls injecting plastic into the second mold of the second injection molding machine according to the retrofit mold cycle, wherein the native controller controls at least one of cooling the plastic object, opening the mold, ejecting the molded object, closing the mold, and recovering the second injection molding machine for a new cycle;

wherein the retrofit average cycle time is 5-35% shorter than the original average cycle time.

2. The method of claim 1, wherein:
the first step includes the injection molding of the production versions of the plastic object, which is made from a first plastic material; and
the second step includes the injection molding of the production versions of the plastic object, which is made from a second plastic material that is essentially the same as the first plastic material.

3. The method of claim 2, wherein the second plastic material is the same as the first plastic material.

4. The method of claim 2, wherein the second mold has the same configuration as the first mold.

5. The method of claim 2, wherein the second mold is the first mold.

6. The method of claim 4, wherein the second injection molding machine has the same configuration as the first injection molding machine.

7. The method of claim 4, wherein the second injection molding machine is the first injection molding machine.

8. The method of claim 1, wherein the retrofit controller controls injection pressures of the injection molding machine for at least part of a filling portion of the retrofit mold cycle.

9. The method of claim 8, wherein the retrofit controller controls injection pressures of the injection molding machine for substantially all of a filling portion of the retrofit mold cycle.

10. The method of claim 8, wherein the retrofit controller controls injection pressures of the injection molding machine for all of a filling portion of the retrofit mold cycle.

11. The method of claim 8, wherein the retrofit controller controls injection pressures of the injection molding machine for at least part of an initial injecting portion of the retrofit mold cycle.

12. The method of claim 8, wherein the retrofit controller controls injection pressures of the injection molding machine for substantially all of an initial injecting portion of the retrofit mold cycle.

13. The method of claim 8, wherein the retrofit controller controls injection pressures of the injection molding machine for all of an initial injecting portion of the retrofit mold cycle.

14. The method of claim 8, wherein the retrofit controller controls injection pressures of the injection molding machine for at least part of a decreasing pressure portion of the retrofit mold cycle.

15. The method of claim 8, wherein the retrofit controller controls injection pressures of the injection molding machine for substantially all of a decreasing pressure portion of the retrofit mold cycle.

16. The method of claim 8, wherein the retrofit average cycle time is 10-35% shorter than the original average cycle time.

17. The method of claim 8, wherein the retrofit average cycle time is 15-35% shorter than the original average cycle time.

18. The method of claim 8, wherein the retrofit average cycle time is 20-35% shorter than the original average cycle time.

19. The method of claim 8, wherein the retrofit average cycle time is 25-35% shorter than the original average cycle time.

* * * * *